(12) United States Patent
Kim et al.

(10) Patent No.: US 12,445,567 B2
(45) Date of Patent: Oct. 14, 2025

(54) DISPLAY APPARATUS AND CONTROL METHOD THEREFOR

(71) Applicant: SAMSUNG ELECTRONICS CO., LTD., Suwon-si (KR)

(72) Inventors: Jaeseong Kim, Suwon-si (KR); Jeongwoo Kang, Suwon-si (KR); Daesung Lim, Suwon-si (KR); Myoungkoo Choi, Suwon-si (KR); Yunho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 18/130,208

(22) Filed: Apr. 3, 2023

(65) Prior Publication Data
US 2023/0262191 A1 Aug. 17, 2023

Related U.S. Application Data

(63) Continuation of application No. PCT/KR2021/014831, filed on Oct. 21, 2021.

(30) Foreign Application Priority Data

Oct. 28, 2020 (KR) .................. 10-2020-0140957

(51) Int. Cl.
*H04N 5/272* (2006.01)
*G06T 1/20* (2006.01)

(52) U.S. Cl.
CPC .............. *H04N 5/272* (2013.01); *G06T 1/20* (2013.01)

(58) Field of Classification Search
CPC ............ G06T 1/20; G06T 11/60; H04N 5/272
See application file for complete search history.

(56) References Cited

U.S. PATENT DOCUMENTS 5,291,275 A 3/1994 Lumelsky
5,404,447 A * 4/1995 Drako ..................... G06F 7/544
348/E5.058

(Continued)

FOREIGN PATENT DOCUMENTS

CN 106897976 A 6/2017
FR 2 861 938 A1 5/2005

(Continued)

OTHER PUBLICATIONS

Communication dated Jan. 30, 2024, issued by the European Patent Office in European Application No. 21886699.4.

(Continued)

*Primary Examiner* — Charles Tseng
(74) *Attorney, Agent, or Firm* — Sughrue Mion, PLLC

(57) ABSTRACT

A method performed by a display apparatus, includes: outputting, by a video processor, a video frame comprising a first area corresponding to area information for the video frame; outputting a graphic frame; generating transparency information corresponding to the area information of the video frame; providing the area information of the video frame and the generated transparency information; adjusting a transparency of a second area of the graphic frame based on the area information and the transparency information; and outputting an image overlapping the video frame and the graphic frame comprising the second area having the adjusted transparency.

18 Claims, 24 Drawing Sheets

(56) References Cited

U.S. PATENT DOCUMENTS

| | | |
|---|---|---|
| 6,909,438 B1 | 6/2005 | White et al. |
| 7,310,104 B2 | 12/2007 | MacInnis et al. |
| 2006/0164437 A1 | 7/2006 | Kuno |
| 2006/0164438 A1 | 7/2006 | Kuno |
| 2007/0223882 A1 | 9/2007 | Kuno |
| 2011/0057952 A1 | 3/2011 | Lee |
| 2011/0304642 A1* | 12/2011 | Coupe .................... H04N 9/76 345/592 |
| 2012/0188459 A1* | 7/2012 | Madonna ............. H04L 12/282 348/E9.055 |
| 2013/0088648 A1 | 4/2013 | Yoon et al. |
| 2013/0169871 A1 | 7/2013 | Park |
| 2015/0213586 A1 | 7/2015 | Koike et al. |
| 2016/0078664 A1 | 3/2016 | Mizuguchi et al. |
| 2016/0300595 A1 | 10/2016 | Jeon |
| 2017/0308261 A1 | 10/2017 | Lee et al. |
| 2018/0174555 A1 | 6/2018 | Lee et al. |
| 2023/0179824 A1 | 6/2023 | Kim et al. |

FOREIGN PATENT DOCUMENTS

| | | |
|---|---|---|
| JP | 2006-191240 A | 7/2006 |
| JP | 2010172012 A | 8/2010 |
| JP | 2015-141333 A | 8/2015 |
| KR | 92-1931 A | 1/1992 |
| KR | 10-2011-0026806 A | 3/2011 |
| KR | 10-2013-0036842 A | 4/2013 |
| KR | 10-2013-0078296 A | 7/2013 |
| KR | 10-2016-0122027 A | 10/2016 |
| KR | 10-2018-0071619 A | 6/2018 |
| KR | 10-2019-0132072 A | 11/2019 |
| WO | 2022/030892 A1 | 2/2022 |

OTHER PUBLICATIONS

Communication dated Oct. 7, 2024, issued by the Korean Intellectual Property Office in Korean Application No. 10-2020-0140957.

International Search Report (PCT/ISA/210) issued by the International Searching Authority on Feb. 10, 2022 to International Application No. PCT/KR2021/014831.

Written Opinion (PCT/ISA/237) issued by the International Searching Authority on Feb. 10, 2022 in International Application No. PCT/KR2021/014831.

Communication dated Jun. 23, 2025, issued by the Korean Intellectual Property Office in Korean Application No. 10-2020-0140957.

* cited by examiner

FIG. 9
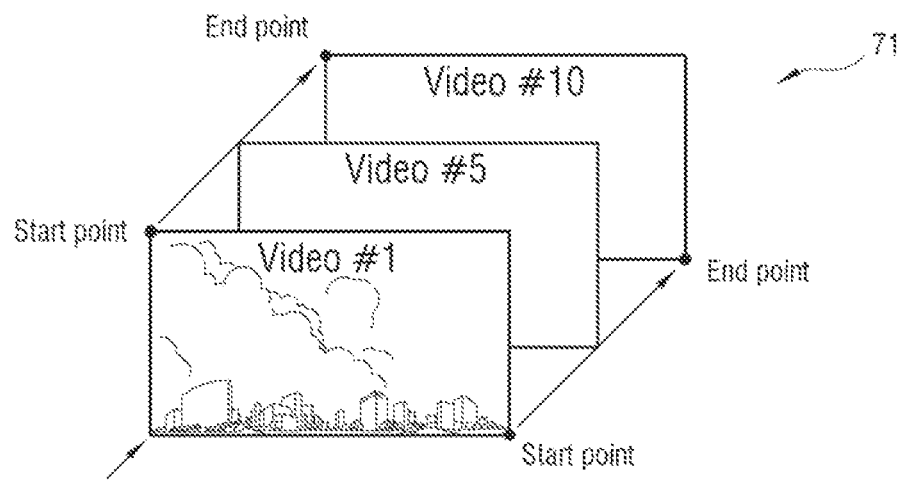
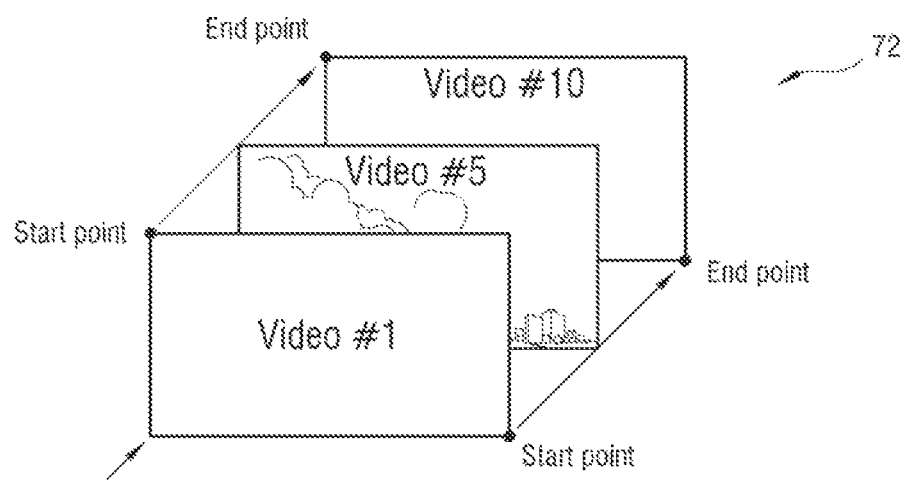
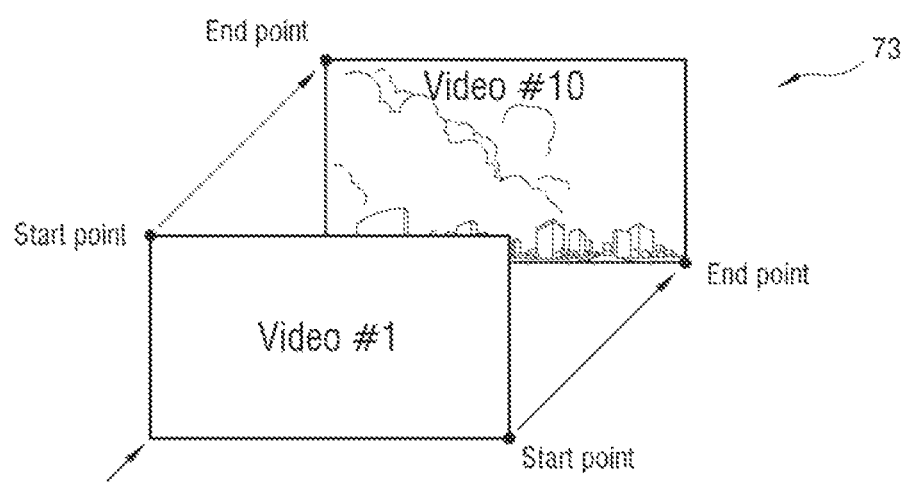

DISPLAY APPARATUS AND CONTROL METHOD THEREFOR

CROSS-REFERENCE TO RELATED APPLICATIONS

This application is a by-pass continuation application of International Application No. PCT/KR2021/014831, filed on Oct. 21, 2021, which is based on and claims priority to Korean Patent Application No. 10-2020-0140957, filed on Oct. 28, 2020, in the Korean Intellectual Property Office, the disclosures of which are incorporated by reference herein their entireties.

BACKGROUND

1. Field

The disclosure relates to a display apparatus and a method of controlling the same. The disclosure relates to a display apparatus, which can display a video and a graphic together, and a method of controlling the same.

2. Description of Related Art

An electronic apparatus with a display, such as a TV, receives various pieces of content from an external source, and displays an image based on the content on the display.

With the recent popularization of various video services using a network environment, broadcast or video provide content including appended images such as graphics and those services have also been gradually expanding.

An electronic apparatus (e.g., the television) may include separate processors for respectively processing a video signal and a graphic signal to improve image quality, and may output the two processed signals to be displayed on a screen together while overlapping each other.

In an electronic apparatus where a video processor and a graphic processor are separately provided, one of the video signal and the graphic signal, e.g., the video signal may be delayed while the two signals are respectively processed through different paths.

In this case, images may not be normally displayed on the screen, for example, the overlapped video and graphic may not match each other, or a boundary between the video and the graphic may be distorted, thereby causing inconvenience to a user in viewing.

SUMMARY

Provided are a display apparatus, which may prevent a mismatch between a video and a graphic or may prevent distortion of an image when a video signal and a graphic signal are overlapped and outputted, and a method of controlling the same.

According to an aspect of the disclosure, a display apparatus includes: a display; a main processor configured to provide, to an information processor, area information for a video frame; a video processor configured to output the video frame includes a first area corresponding to the area information for the video frame; and a graphic processor configured to output a graphic frame. The information processor is configured to: generate transparency information corresponding to the area information of the video frame, and provide, to a mixer, the area information of the video frame and the generated transparency information. The mixer is configured to: adjust a transparency of a second area of the graphic frame based on the area information and the transparency information, and output, on the display, an image overlapping the video frame and the graphic frame includes the second area having the adjusted transparency.

The first area of the video frame may correspond to the second area of the graphic frame.

The video frame may be one frame among a plurality of video frames that are sequentially outputted from the video processor.

The information processor may include a data generator configured to generate the transparency information.

The data generator may be further configured to: identify the video frame based on data received from the video processor, and generate the transparency information corresponding to the area information of the identified video frame.

The transparency information generated by the data generator may be one (1) bit data. The information processor may further include a data converter configured to convert the one (1) bit data of the transparency information into eight (8) bit data.

The transparency information may include an alpha value of one ('1') or zero ('0').

The graphic processor may be further configured to output another transparency information. The mixer may be further configured to: select any one of the transparency information output processor and the another transparency information output from the graphic processor, and adjust the transparency of the second area of the graphic frame based on the selected transparency information.

The mixer may be further configured to select the transparency information output from the information processor, based on the graphic frame being identified as corresponding to a motion user experience (UX).

The area information of the video frame output from the main processor may be provided to the information processor through the video processor.

According to another aspect of the disclosure, a method performed by a display apparatus, includes: outputting, by a video processor, a video frame includes a first area corresponding to area information for the video frame; outputting a graphic frame; generating transparency information corresponding to the area information of the video frame; providing the area information of the video frame and the generated transparency information; adjusting a transparency of a second area of the graphic frame based on the area information and the transparency information; and outputting an image overlapping the video frame and the graphic frame that includes the second area having the adjusted transparency.

The first area of the video frame may correspond to the second area of the graphic frame.

The video frame may be a frame among a plurality of video frames that are sequentially outputted from the video processor.

The method may further include generating the transparency information based on the area information of the video frame.

The method may further include: identifying the video frame based on data received from the video processor; and generating the transparency information corresponding to the area information of the identified video frame.

The method may further include: generating the transparency information that may be one (1) bit data; and converting the one (1) bit data of the transparency information into eight (8) bit data.

According to another aspect of the disclosure, an electronic device includes: a display; a first processor configured to generate area information for a video frame and to output a graphic frame; a second processor configured to: receive the area information for the video frame, output the video frame includes a first area corresponding to the area information for the video frame, generate transparency information corresponding to the area information of the video frame, adjust a transparency of a second area of the graphic frame based on the area information and the transparency information, and output, on the display, an image overlapping the video frame and the graphic frame includes the second area having the adjusted transparency.

The first area of the video frame may correspond to the second area of the graphic frame.

As described above, in a display apparatus according to the disclosure and a method of controlling the same, a transparency of a graphic frame is controlled to be adjusted corresponding to a video frame, so that an image where a video and a graphic are overlapped can be displayed without distortion, thereby eliminating inconvenience to a user in viewing and decreasing visual fatigue.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates mixed data for each frame, which is output from an electronic apparatus according to an embodiment of the disclosure by adjusting the transparency of a graphic frame;

FIG. 2 illustrates operations of elements synchronizing and displaying an image, for which frame rate conversion is performed, according to the embodiment of FIG. 18;

DETAILED DESCRIPTION

Figure 1:
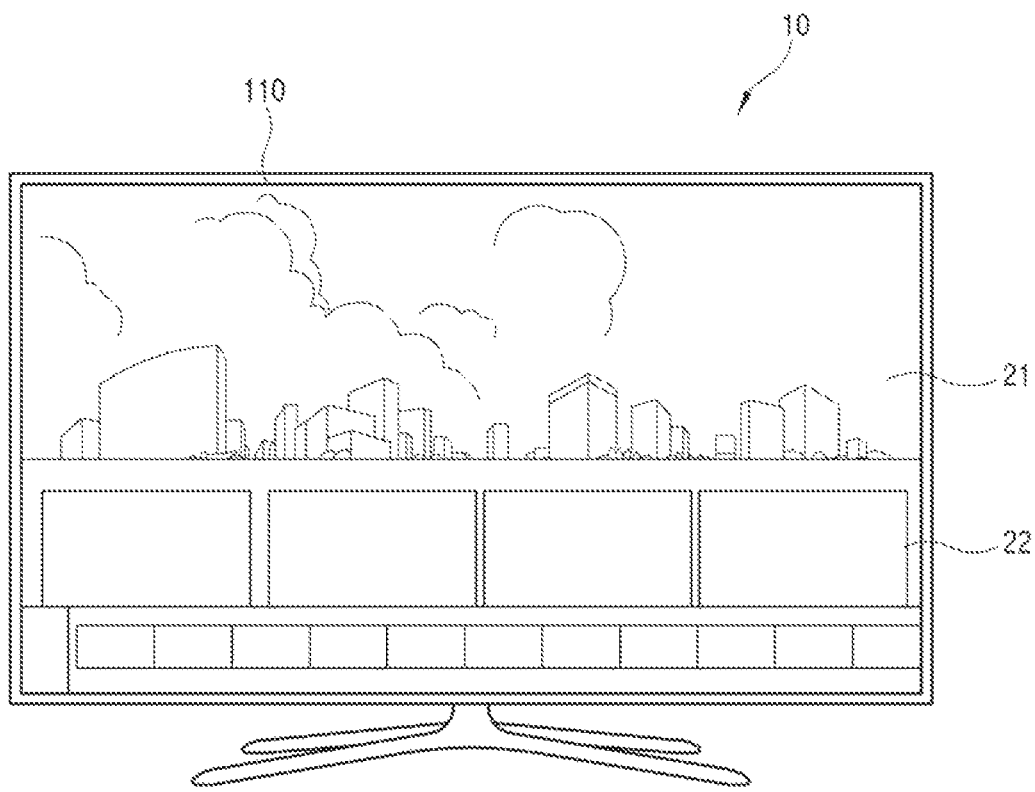
FIG. 1 illustrates an example of an electronic apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

FIG. 1 illustrates an example of an electronic apparatus according to an embodiment of the disclosure.

According to an embodiment of the disclosure, an electronic apparatus 10 may be implemented as a display apparatus including a display 110 as shown in FIG. 1.

The electronic apparatus 10 according to an embodiment of the disclosure receives a signal from an external signal source, for example, data about content, and processes the received data of content according to preset processes so as to be displayed as an image on the display 110.

According to an embodiment, the electronic apparatus 10 implemented as the display apparatus may include a TV that processes a broadcast image based on at least one among a broadcast signal, broadcast information, or broadcast data received from a transmitter of a broadcasting station. In this case, the electronic apparatus 10 may include a tuner to be tuned to a channel corresponding to a broadcast signal.

However, the disclosure is not limited to the implementation example of the electronic apparatus 10. Alternatively, the electronic apparatus 10 may be implemented as an image processing apparatus such as a set-top box, a player for an optical disc such as a Blu-ray disc (BD), a game console such as an X-box, or the like that transmits a signal to an external display connected by a wire or wirelessly.

Alternatively, the electronic apparatus 10 may be implemented as a terminal apparatus (hereinafter also referred to as a user terminal or a user device) with a display, such as a smart phone, a tablet, and a smart pad. Alternatively, the electronic apparatus 10 may be applied to a monitor for a desktop or laptop computer (or a personal computer (PC)).

When the electronic apparatus 10 is a TV, the electronic apparatus 10 may receive broadcast content based on at least one among a broadcast signal, broadcast information or broadcast data from a transmitter of a broadcasting station directly or through an additional apparatus connectable with the electronic apparatus 10 by a cable, for example, through a set-top box (STB), a one-connect box (OC box), a media box, etc. Here, the connection between the electronic apparatus 10 and the additional apparatus is not limited to the cable, but may employ various wired/wireless interfaces.

For example, the electronic apparatus 10 may wirelessly receive a radio frequency (RF) signal (i.e., broadcast content) transmitted from the broadcasting station. To this end, the electronic apparatus 10 may include an antenna for receiving a broadcast signal.

In the electronic apparatus 10, the broadcast content may be received through a terrestrial wave, a cable, a satellite, etc., and a signal source is not limited to the broadcasting station. In other words, any apparatus or station capable of transmitting and receiving data may be included in the source according to the disclosure.

Figure 2:
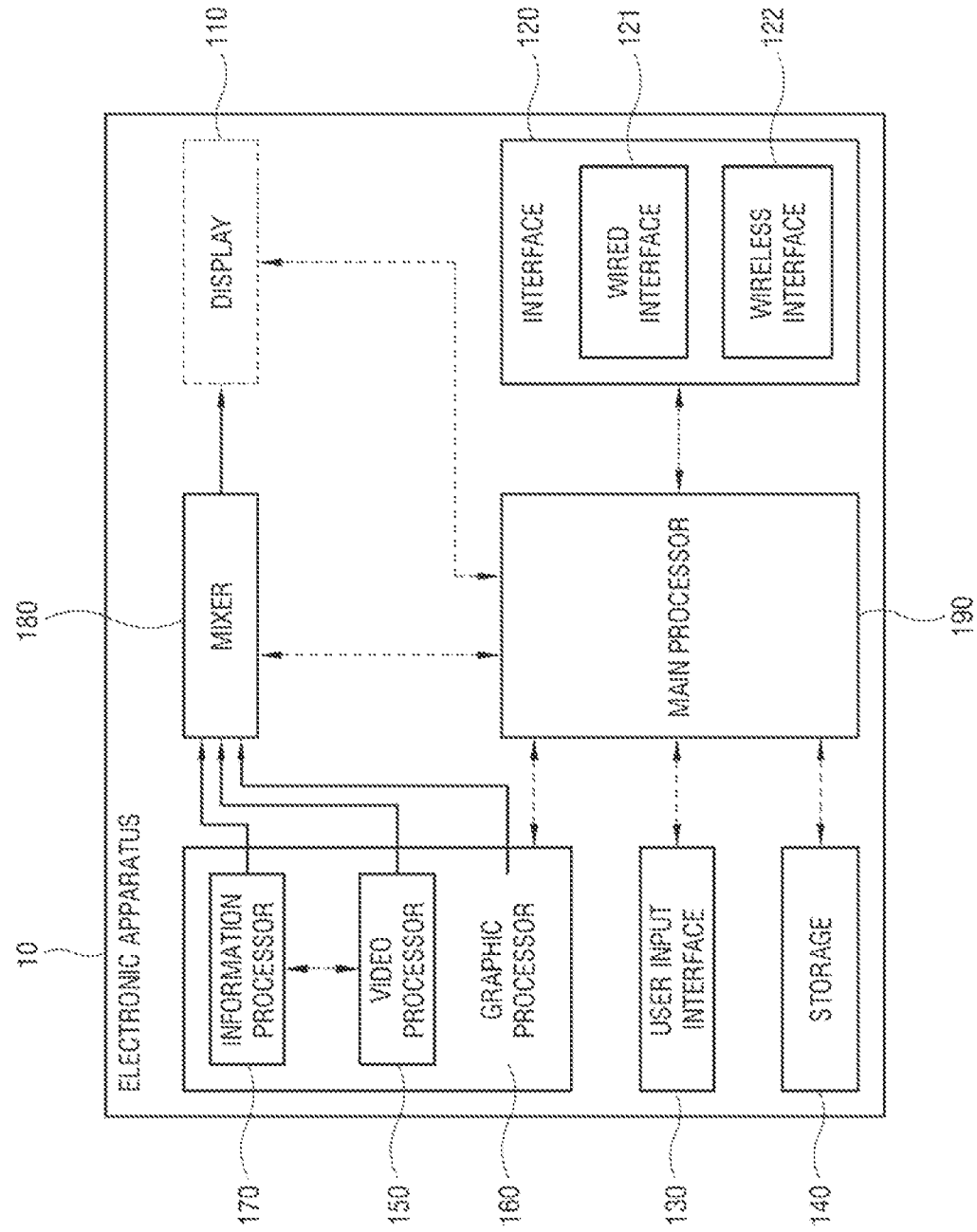
FIG. 2 illustrates the configuration of an electronic apparatus according to an embodiment of the disclosure.

Standards of a signal received in the electronic apparatus 10 may be varied depending on the types of the apparatus, and the electronic apparatus 10 may receive a signal as image content based on high definition multimedia interface (HDMI), HDMI-consumer electronics control (CEC), display port (DP), digital visual interface (DVI), composite video, component video, super video, DVI, Thunderbolt, RGB cable, syndicat des constructeurs d'appareils radioré-cepteurs et téléviseurs (SCART), universal serial bus (USB), or the like standards by a cable, according to the interface 120 (see FIG. 2).

According to an embodiment, the electronic apparatus 10 may be implemented as a smart TV or an Internet protocol (IP) TV. The smart TV refers to a TV that can receive and display a broadcast signal in real time, have a web browsing function to search and consume various pieces of content through the Internet while displaying the broadcast signal in real time, and provide a convenient user environment for this end. Further, the smart TV can provide an interactive service to a user because it includes an open software platform. Therefore, the smart TV can provide various pieces of content, for example, content of an application for a predetermined service to a user through the open software platform. Such an application refers to an application program for various kinds of services, for example, applications for social network service (SNS), finance, news, weather, map, music, movie, game, electronic book, and the like services.

The electronic apparatus 10 may process a signal to display a moving image, a still image, an application, an on-screen display (OSD), a user interface (UI) (hereinafter also referred to as a graphic user interface (GUI)) for controlling various operations, etc. on a screen based on a signal/data stored in an internal/external storage medium.

The electronic apparatus 10 may use wired or wireless network communication to receive content from various external apparatuses including a server and a terminal apparatus as a source for providing content, but there are no limits to the kinds of communication.

Specifically, the electronic apparatus 10 may use the wireless network communication to receive a signal corresponding to standards of Wi-Fi, Wi-Fi Direct, Bluetooth (BT), Bluetooth low energy (BLE), Zigbee, ultrawideband (UWB), near field communication (NFC), etc. as image content corresponding to the type of the interface 120 (to be described later). Further, the electronic apparatus 10 may use Ethernet or the like wired network communication to receive a content signal.

According to an embodiment, the external apparatus may be provided as a content provider (i.e., a content server) that can transmit content to various apparatuses such as the electronic apparatus 10 through the wired or wireless network. For example, the external apparatus may provide a media file based on video on demand (VOD) service, web content, etc. by a streaming method in real time.

According to an embodiment of the disclosure, there may be a plurality of external apparatuses (i.e., servers 20). In this case, the electronic apparatus 10 may be implemented to connect with each of the plurality of external apparatuses and receive various pieces of content from each connected external apparatus.

The electronic apparatus 10 may, for example, receive media content or video content based on the VOD service from an over-the-top (OTT) server capable of providing an OTT service such as Netflix or a web server such as YouTube.

The electronic apparatus 10 may execute an application for reproducing content, for example, a VOD application to receive content from an external apparatus for providing the content, ad process the received content, thereby outputting (i.e., displaying) an image corresponding to that content through the display 110. Here, the electronic apparatus 10 may receive the content from the server (i.e., the external apparatus) based on a user account corresponding to the executed application.

According to an embodiment, the electronic apparatus 10 may, as shown in FIG. 1, display a first image 21 and a second image 22 together on a display 110.

Specifically, the electronic apparatus 10 may receive a first signal corresponding to the first image 21 (hereinafter also referred to as a first image signal) and a second signal corresponding to a second image 22 (hereinafter also referred to as a second image signal), and process each of the received first and second signals. As described above, the electronic apparatus 10 may mix the first and second signals processed through separate paths, and display two images (the first image 21 and the second image 22) together on the display 110.

Here, the first signal may correspond to a video signal, and the second signal may correspond to a graphic signal.

The graphic signal may, for example, include signals for displaying a subpicture, a subtitle, a teletext, an on-screen display (OSD) displayed for transferring information (a channel number, a program title, relevant information, etc.) to a user or controlling various operations, a user interface (UI), a user experience (UX), etc., but is not limited thereto.

The graphic signal may be included in content provided by a server and the like external apparatus, or provided as a signal separated from the content by the external apparatus. Here, the external apparatus providing the content may be the same as or different from the external apparatus providing the graphic signal. Further, the graphic signal may be embedded in the electronic apparatus 10 or an additional device such as the STB. According to an embodiment, the graphic signal may be provided as a plurality of layers.

According to an embodiment, the electronic apparatus 10 may display an interactive graphic (IG) or presentation graphic (PG), which is generated by processing the graphic signal, as a second image on the display 110.

According to an embodiment, the second image based on the graphic signal (i.e., the graphic) may be displayed on the display 110 as overlapping (i.e., overlaying) the first image (e.g., the video) based on the video signal, or in an area separated from an area where the first image (e.g., the video) is displayed based on the video signal.

According to an embodiment, the graphic may be classified into a motion UX and a static UX. The motion UX refers to a graphic displayed being changed in at least one of position, size, shape, etc. during a section corresponding to a predetermined number of frames. For example, in the motion UX, a certain area (e.g., a first area) of the graphic is moved, expanded or reduced for a section corresponding to the nth to (n+9)th frames.

In contrast, the static UX refers to a graphic displayed without being changed in any of the position, size, shape, etc. during a section corresponding to a predetermined number of frames.

According to an embodiment of the disclosure, the configurations of the electronic apparatus will be described with reference to the accompanying drawings.

FIG. 2 illustrates an example of an electronic apparatus according to an embodiment of the disclosure. FIG. 2 merely shows the exemplary elements of the electronic apparatus 10 according to an embodiment of the disclosure, and the first electronic apparatus according to an alternative embodiment may include elements different from those of FIG. 2. In other words, the electronic apparatus 10 of the disclosure may include another element besides the elements shown in FIG. 2, or may exclude at least one element from the elements shown in FIG. 2. Further, the electronic apparatus 10 of the disclosure may be implemented by changing some elements of those shown in FIG. 2.

The electronic apparatus 10 according to an embodiment of the disclosure may, as shown in FIG. 2, include the display 110. The display 110 may display an image. The display 110 may be, but not limited to, for example implemented by various display types such as liquid crystal, plasma, light-emitting diode, organic light-emitting diode, surface-conduction electron-emitter, carbon nano-tube, nano-crystal, etc.

According to an embodiment, the display 110 may include a display panel for displaying an image thereon, and further include additional elements, for example, a driver according to its types.

According to an embodiment, the display 110 may display an image of content received from the source, e.g., the external apparatus such as the server.

According to an embodiment, the first image (e.g., the video) based on the first signal (e.g., the video signal) and the second image (e.g., the graphic) based on the second signal (e.g., the graphic signal) may be displayed on the display 110 together.

According to an embodiment, the second image (e.g., the graphic) may be displayed on the display 110, which is overlapping (or overlaying) with the first image (e.g., the video). In another embodiment, the second image (e.g., the graphic) may be displayed in a separate area separated from an area where the first image (e.g., the video) is displayed.

The electronic apparatus 10 may include an interface 120. The interface 120 allows the electronic apparatus 10 to communicate with various external apparatuses such as the server. The interface 120 may include a wired interface 121.

The wired interface 121 may include a connector for transmitting/receiving a signal/data based on the standards such as HDMI, HDMI-CEC, USB, Component, DP, DVI, Thunderbolt, RGB cables, etc. Here, the wired interface 121 may include at least one connector, terminal or port respectively corresponding to such standards.

The wired interface 121 is embodied to include an input port to receive a signal from the source or the like, and further include an output port as necessary to interactively transmit and receive a signal.

The wired interface 121 may include a connector, port, etc. based on video and/or audio transmission standards, such as an HDMI port, a DisplayPort, a DVI port, Thunderbolt, composite video, component video, super video, and SCART, so as to connect with an antenna for receiving a broadcast signal based on broadcast standards such as terrestrial/satellite broadcasts, or a cable for receiving a broadcast signal based on cable broadcast standards. Alternatively, the electronic apparatus 10 may include a built-in antenna for receiving a broadcast signal.

When a video/audio signal received through the interface 120 is a broadcast signal, the electronic apparatus 10 may further include a tuner to be tuned to the channels corresponding to the received broadcast signals. The tuner may include a demodulator that demodulates a broadcast signal of a certain tuned channel and outputs a signal in the form of a transport stream (TS). In other words, the tuner and the demodulator may be designed as a single integrated chip, or alternatively, may be respectively designed as separated two chips.

The wired interface 121 may include a connector or port based on universal data transmission standards, such as a USB port. The wired interface 121 may include a connector or port to which an optical cable based on optical transmission standards is connectable. The wired interface 121 may include a connector or port to which an external microphone or an external audio device with a microphone is connected for the reception or input of an audio signal from the microphone or audio device. The wired interface 121 may include a connector or port to which a headset, an earphone, an external loudspeaker and the like audio device is connected for the transmission or output of an audio signal to the audio device. The wired interface 121 may include a connector or port based on network transmission standards such as Ethernet. For example, the wired interface 121 may be implemented as a local area network (LAN) connected to a router or a gateway by a wire.

The wired interface 121 is connected to the STB, an optical media reproducing device or the like external device, an external display apparatus, a loudspeaker, a server, etc. through the connector or port by 1:1 or 1:N (where, N is a natural number), thereby receiving a video/audio signal from the external device or transmitting a video/audio signal to the external device. The wired interface 121 may include connectors or ports for individually transmitting video/audio signals.

The wired interface 121 may be implemented by a communication circuitry including wireless communication modules (e.g., an S/W module, a chip, etc.) corresponding to various kinds of communication protocols.

According to an embodiment, the wired interface 121 may be built-in the electronic apparatus 10 or implemented as a dongle or a module and detachably connected to the connector of the electronic apparatus 10.

The interface 120 may include a wireless interface 122. The wireless interface 122 may be variously implemented corresponding to the implementation of the electronic apparatus 100. For example, the wireless interface 122 may employ wireless communication methods such as radio frequency, Zigbee, BT, Wi-Fi, UWB, NFC, etc.

The wireless interface 122 may be implemented by a communication circuitry including wired or wireless communication modules (e.g., an S/W module, a chip, etc.) corresponding to various kinds of communication protocols.

According to an embodiment, the wireless interface 122 includes a wireless local area network (WLAN) unit. The WLAN unit may be wirelessly connected to external apparatuses through an access point (AP) under control of a main processor 190. The WLAN unit includes a Wi-Fi communication module.

According to an embodiment, the wireless interface 122 includes a wireless communication module supporting one-to-one direct communication between the electronic apparatus 10 and the external apparatus wirelessly without the AP. The wireless communication module may be implemented to support Wi-Fi direct, BT, BLE, or the like communication method. When the electronic apparatus 10 performs direct communication with the external apparatus, a storage 140 may be configured to store identification information (e.g. media access control (MAC) address or Internet protocol (IP) address) about the external apparatus with which the communication will be performed. According to an embodiment of the disclosure, the wireless interface 122 is configured to perform wireless communication with the external apparatus by at least one of the WLAN unit and the wireless communication module according to its performance.

According to an alternative embodiment, the wireless interface 122 may further include a communication module based on various communication methods such as long-term evolution (LTE) or the like mobile communication, electromagnetic (EM) communication including a magnetic field, visible light communication (VLC), etc.

The wireless interface 122 may wirelessly communicate with the external apparatus such as the server on the network, thereby transmitting and receiving a data packet to and from the external apparatus.

The wireless interface 122 may include an infrared (IR) transmitter and/or an IR receiver to transmit and/or receive an IR signal according to IR communication standards. The wireless interface 122 may receive or input a remote-control signal from a remote controller or other external apparatuses or transmit or output a remote-control signal to other external apparatuses through the IR transmitter and/or IR receiver. Alternatively, the electronic apparatus 10 may exchange a remote-control signal with the remote controller or other external apparatuses through the wireless interface 122 based on another method such as Wi-Fi, BT, etc.

According to an embodiment, the wireless interface 122 may transmit predetermined data that indicate a user voice received through the microphone or the like voice input to the server or the like external apparatus. Here, there are no limits to the format/kind of data to be transmitted, and the data may, for example, include an audio signal corresponding to a voice uttered by a user, voice features extracted from the audio signal, etc.

Further, the wireless interface 122 may receive data based on a processing result of a corresponding user voice from the server or the like external apparatus. The electronic apparatus 10 may output a sound corresponding to the voice processing result through an internal or external loudspeaker, based on the received data.

However, the foregoing embodiment is merely an example, and the user voice may be processed by the electronic apparatus 10 without being transmitted to the server. In other words, according to an alternative embodiment, the electronic apparatus 10 may be implemented to serve as a speech-to-text (STT) server.

The electronic apparatus 10 may communicate with the remote controller or the like input device through the wireless interface 122, and receive a sound signal corresponding to the user voice from the input device.

In the electronic apparatus 10 according to an embodiment, a communication module for communicating with the server or the like external apparatus and a communication module for communicating with the remote controller may be different from each other. For example, the electronic apparatus 10 may use an Ethernet modem or a Wi-Fi module to communicate with the external apparatus, and use a Bluetooth module to communicate with the remote controller.

In the electronic apparatus 10 according to an alternative embodiment, a communication module for communicating with the server or the like external apparatus and a communication module for communicating with the remote controller may be the same with each other. For example, the electronic apparatus 10 may use the Bluetooth module to communicate with the external apparatus and the remote controller.

According to an embodiment, the wireless interface 122 may be built-in the electronic apparatus 10 or implemented as a dongle or a module and detachably connected to the connector of the electronic apparatus 10.

According to an embodiment, the electronic apparatus 10 may receive a broadcast signal through the interface 120. The electronic apparatus 10 may extract or generate the first signal (e.g., the video signal) corresponding to the first image and the second signal (e.g., the graphic signal) corresponding to the second image based on data carried by the broadcast signal.

According to an embodiment, the electronic apparatus 10 may receive a content signal from the external apparatus such as the server through the interface 120 by a real-time streaming method. The electronic apparatus 10 may extract or generate the first signal (e.g., the video signal) corresponding to the first image and the second signal (e.g., the graphic signal) corresponding to the second image based on the content signal.

The electronic apparatus 10 may include a user input interface 130.

The user input interface 130 transmits various preset control instructions or unrestricted information to the main processor 190 (to be described later) in response to a user input.

The user input interface 130 may include various input means for receiving a user's input.

According to an embodiment, the user input interface 130 may include a keypad (or an input panel) including a power key, a numeral key, a menu key or the like buttons provided in the electronic apparatus 10.

According to an embodiment, the user input interface 130 includes an input device that generates a command/data/information/signal previously set to remotely control the electronic apparatus 10 and transmits it to the electronic apparatus 10. The input device may for example include a remote controller, a game console, a keyboard, a mouse, etc. and receive a user input as separated from the electronic apparatus 10.

The remote controller may include at least one button for receiving a user's input. According to an embodiment, the remote controller may include a touch sensor for receiving a user's touch input and/or a motion sensor for detecting the remote controller's own motion caused by a user. According to an embodiment, the input device includes a terminal such as a smartphone in which a remote-control application is installed. In this case, the input device can receive a user's touch input through the touch screen.

The input device is used as an external apparatus that performs wireless communication with the main body of the electronic apparatus 10, in which the wireless communication is based on Bluetooth, IrDA, RF communication, WLAN, or Wi-Fi direct.

According to an embodiment, the user input interface 130 may include a voice input unit for receiving a voice/sound uttered by a user. The voice input unit may be implemented as a microphone capable of receiving a user's voice, and the microphone may be provided in the electronic apparatus 10, provided separately from the electronic apparatus 10, or provided in another device, for example, a remote controller separated from the electronic apparatus 10.

According to an embodiment, the user input interface 130 may include a motion detector that detects a user's hand motion (i.e., a hand gesture) (hereinafter, referred to as a 'gesture'). The motion detector of the electronic apparatus 10 may output data by detecting the moving distance, the moving speed, the area of a moving region, etc. of a hand.

The electronic apparatus 10 may include the storage 140.

The storage 140 may be configured to store various pieces of data of the electronic apparatus 10.

The storage 140 may be implemented by a nonvolatile memory (or a writable read only memory (ROM)) which can retain data even though the electronic apparatus 10 is powered off, and mirror changes. That is, the storage 140 may include one among a flash memory, a hard disk drive (HDD), an erasable programmable ROM (EPROM) or an electrically erasable programmable ROM (EEPROM). The storage 140 may further include a volatile memory such as a dynamic random-access memory (DRAM) or a static random-access memory (SRAM), of which reading or writing speed for the electronic apparatus 10 is faster than that of the nonvolatile memory.

Data stored in the storage 140 may for example include not only an OS for driving the electronic apparatus 10 but also various programs, applications, image data, appended data, etc. executable on the OS.

Specifically, the storage 140 may be configured to store a signal or data input/output corresponding to operations of the elements under control of the main processor 190. The storage 140 may be configured to store a control program for controlling the electronic apparatus 10, an application provided by the manufacturer or downloaded from the outside, a relevant UI, graphics or images for providing the UI, user information, documents, databases, or the concerned data.

According to an embodiment, the storage 140 may be configured to store a TV application or a TV client as a program for operating the electronic apparatus 10 as a TV, and a VOD application as a program for reproducing content received from the server and the like external apparatus.

According to an embodiment, images, such as a first image (e.g., a video) and a second image (e.g., a graphic), displayed in the electronic apparatus 10 may be based on data stored in a flash memory, a hard disk, a storage 140, or the like. The storage 140 may be provided inside or outside the electronic apparatus 10, and the storage 140 provided outside may be connected to the electronic apparatus 10 via the wired interface 121.

According to an embodiment of the disclosure, the term 'storage' is defined to include the storage 140, the ROM in the main processor 190, a RAM or a memory card (e.g., a micro-SD card, a memory stick, etc.) mountable to the electronic apparatus 10.

The electronic apparatus 10 may include a video processor 150.

The video processor 150 may process the first signal (i.e., the video signal), so that the first image (i.e., the video corresponding to the first signal) can be displayed on the display 110.

The electronic apparatus 10 according to an embodiment of the disclosure may process the video signal through a first path (i.e., a video path) using the video processor 150. Here, the first path is different from a second path (i.e., a graphic path) through which the graphic signal is processed by a graphic processor 160 (to be described later).

Figure 3:
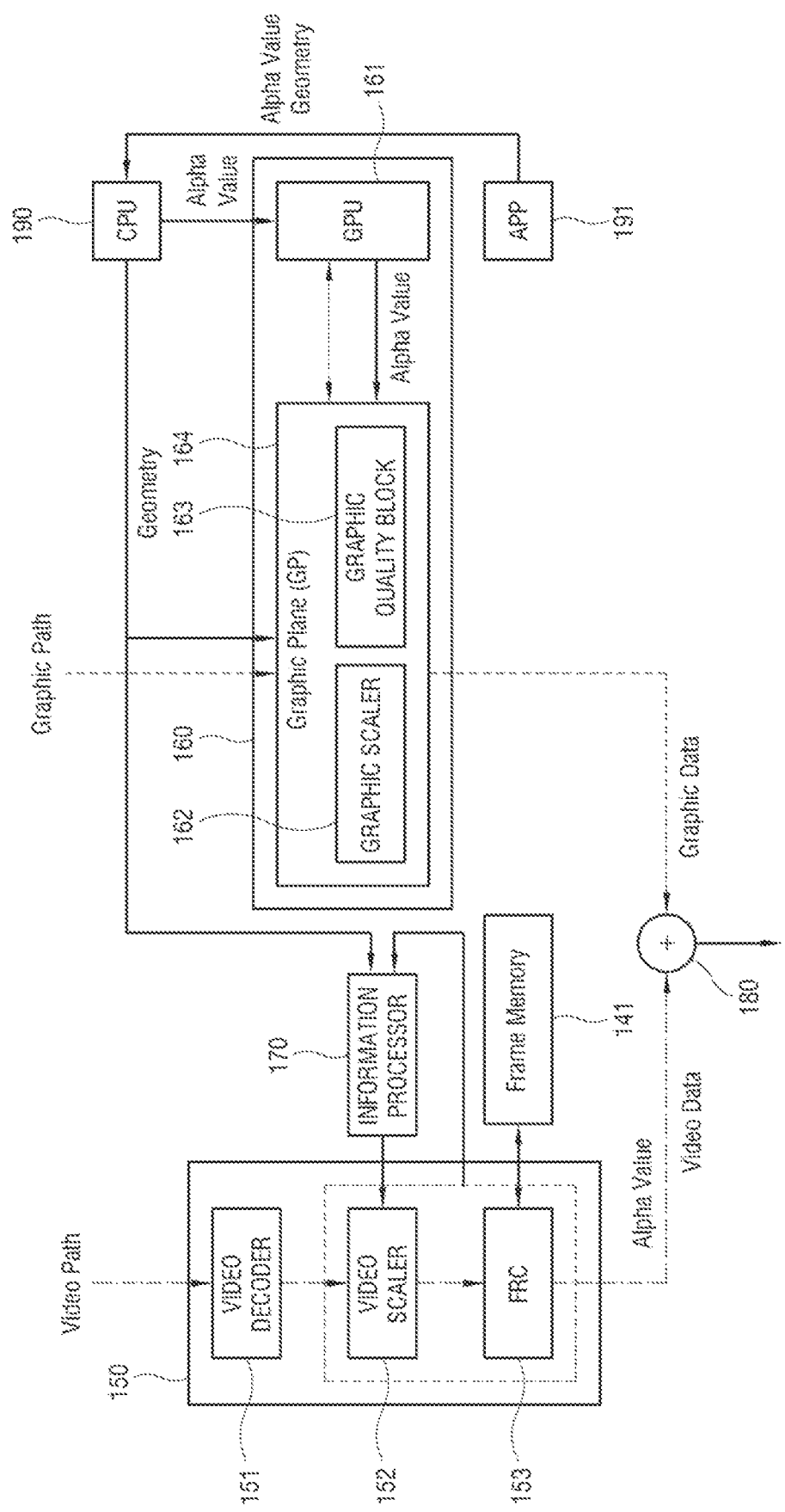
FIG. 3 illustrates paths through which a video signal and a graphic signal are processed in an electronic apparatus according to an embodiment of the disclosure.

FIG. 3 illustrates paths through which the video signal and the graphic signal are processed in the electronic apparatus according to an embodiment of the disclosure.

The video processor 150 refers to an element that performs various preset processes for the first image signal (i.e., the video signal), and may, as shown in FIG. 3, include a video decoder 151 for decoding an image signal to have an image format of the electronic apparatus 10.

According to an embodiment, the video decoder may, for example, be implemented by an H.264/AVC decoder, but not limited thereto. In other words, the video decoder in this embodiment may, for example, be implemented by a moving picture experts group (MPEG) decoder, a high efficiency video codec (HEVC) decoder, or the like decoders corresponding to various compression standards. The video decoder may be implemented as a hardware decoder or a software decoder.

According to an embodiment, the electronic apparatus 10 may include a plurality of video decoders. Here, the plurality of video decoders provided in the electronic apparatus 10 may be each implemented as the hardware decoder or the software decoder, or a combination of the hardware decoder and the software decoder.

The video processor 150 may include a video scaler (hereinafter also referred to as a 'V scaler') 152 that adjusts the first signal (i.e., the video signal) to meet the output standards, e.g., the panel specifications of the display 110.

According to an embodiment, the video scaler 152 may process the video signal for each frame in response to a sync signal. Here, the sync signal may, for example, be a vertical sync signal ('Vsync') for the display 110.

Specifically, the video scaler 152 may process (i.e., scale) and output a plurality of video frames of the video signal in sequence based on the sync signal (i.e., the vertical sync signal) for the display 110.

According to an embodiment, the video scaler 152 may be implemented as a hardware element, for example, a chip so that the plurality of scaled video frames can be sequentially stored in the hardware element (e.g., the chip) and output to a buffer or a frame buffer (hereinafter also referred to as a 'video buffer'). Here, the buffer may, for example, be provided in the storage 140 implemented as the DRAM or the like memory.

The video scaler 152 may sequentially scale and output the plurality of video frames based on video frame information identified or set by an application 191 (i.e., software installed in the electronic apparatus 10). Here, the video frame information may include area information about each video frame.

Figure 4:
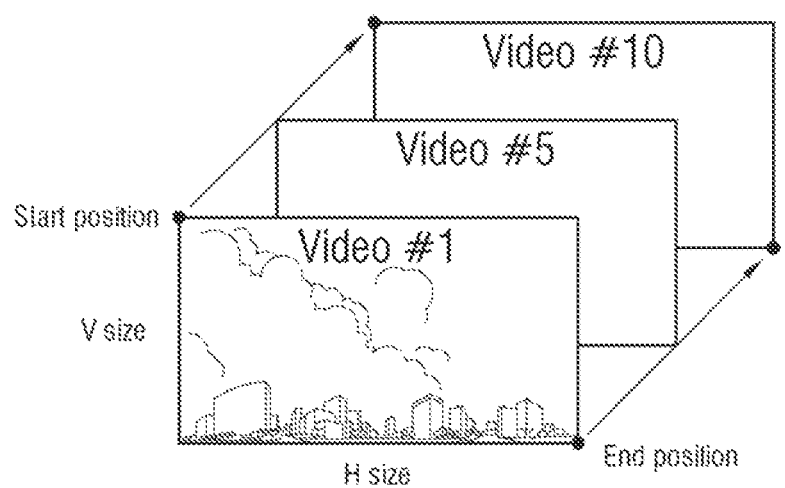
FIG. 4 illustrates an example of video frames output based on area information in an electronic apparatus according to an embodiment of the disclosure.

FIG. 4 illustrates an example of video frames output based on the video frame information in the electronic apparatus according to an embodiment of the disclosure, and the video frame will be described in more detail with reference to FIG. 4.

According to an embodiment, the video frame information (i.e., the area information) may include geometry information indicating the size and position of the first image (i.e., the video for each frame).

As shown in FIG. 4, the geometry information may include information set for the video frames (Video #1 to Video #10), for example, at least one of size information ("V size" and "H size") of the video or position information ("Start position" and "End position").

Further, the geometry information may include information about a start point and an end point of the second image (i.e., the graphic corresponding to the graphic signal). Each frame of the graphic signal may be controlled to be an output in a section between the start point and the end point.

According to an embodiment, the geometry information may include coordinate values as parameters for representing the video and the graphic for each frame.

Referring back to FIG. 3, the video scaler 152 may reflect and output the geometry information to the video data for each frame.

According to an embodiment, the geometry information may be transmitted from a central processing unit (CPU) 190, which is an example of a main processor 190 (to be described later), to the video scaler 152. In one embodiment illustrated in FIG. 3, the geometry information output from the main processor 190 is provided to the video scaler 152 through an information processor 170, but the disclosure is not limited thereto. According to an alternative embodiment, the video scaler 152 may acquire the geometry information directly from the CPU 190 (the main processor 190). Please note that the CPU 190 and the main processor 190 are used interchangeably in the disclosure.

The main processor 190 (the CPU 190) may execute the application 191 installed in the electronic apparatus 10, acquire the geometry information (data) from the executed application 191, and provide the acquired geometry information (data) to the video scaler 152 (e.g., via the information processor 170).

Here, the application 191 may generate and provide, to the main processor 190 (the CPU 190), transparency information of the graphic along with the geometry information. The transparency information may represent a transparency for a certain area (e.g., a first area 33 in FIG. 5) of the graphic frame, and that certain area may correspond to area information of the video frame.

In one embodiment, the transparency information may be represented by an alpha value, and the alpha value may be expressed as a value within a range from '0.0 (fully transparent)' to '1.0 (fully opaque).' The alpha value may, for example, be given as 8-bit data to distinguish a degree of transparency from '0' to '255.' However, the alpha value is not limited thereto. For example, the alpha value may be expressed as data within a range from '0' to '511' or a range from '0' to '1023' as necessary.

The video scaler 152 may adjust the size and position of an image (video) corresponding to the video signal based on the geometry information received from the CPU 190 (the main processor 190), thereby generating an output image (i.e., a video).

According to an embodiment, the video processor 150 may include a frame rate converter (FRC) 153 to perform frame rate conversion (FRC) for the first signal (i.e., the video signal) output from the video scaler. The video frames, of which the frame rates are converted by the FRC 153, may be sequentially stored in a frame memory 141 and then output (e.g., to a mixer 180).

The FRC 153 may be implemented as a hardware chip separated from the video scaler 152, or may be designed in the form of a single chip where the video scaler 152 and the FRC 153 are combined.

The FRC 153 may output, to the display 110, the first image that may be varied in a number of frames per second, and, in this process, a video frame delay in which the first signal (e.g., the video signal) is displayed may occur.

Such video frame delay may occur in the FRC process regardless of processing the video signal based on the foregoing sync signal (e.g., "V sync").

Further, the occurrence of the video frame delay (due to the FRC 153) may depend on, for example, types of the video signal. For example, in a movie or the like video mode, the FRC 153 causes the video frame delay to occur by predetermined frames, e.g., three frames. In a game mode, the FRC 153 may not cause the video frame delay to occur. In this case, the video frame delay (due to the FRC 153) may be identified by the electronic apparatus 10 based on the operation modes.

However, the occurrence of the video frame delay is not limited to the foregoing example, but, in some cases, the video frame delay may occur due to computation in other stages for processing the video signal.

For example, the video processor 150 may perform at least one of various processes such as de-interlacing for converting an interlaced broadcast signal into a progressive broadcast signal, noise reduction for improving image quality, detail enhancement, frame refresh rate conversion, line scanning, and the like for processing the video signal. However, this is merely an example, and an additional element may be provided for processing the foregoing processes.

The electronic apparatus 10 may include the graphic processor 160. The graphic processor 160 may process the second signal (i.e., the graphic signal), so that the second image (i.e., the graphic) corresponding to the second signal can be displayed on the display 110.

As shown in FIG. 3, the graphic processor 160 may process the graphic signal through the second path (i.e., the graphic path). The second path is different from the first path (i.e., the video path) for the video signal to be processed by the video processor 150.

As shown in FIG. 3, the graphic processor 160 may include a graphic processing unit (GPU) 161, which performs computation for processing the graphic, as an element for processing various processes for the second signal (i.e., the graphic signal).

FIG. 3 illustrates an example that the GPU 161 is provided as a separate element, but the electronic apparatus 10 according to an alternative embodiment of the disclosure may be implemented to make the main processor 190 (the CPU 190) perform the computation for processing the graphic. In one embodiment, the CPU 190 and the GPU 161 are included in a single processor.

According to an embodiment, the GPU 161 may perform at least one of various processes such as animation processing, color conversion, gamma conversion, and acceleration processing, which are preset for the second signal (i.e., the graphic signal) received from the server or the like external apparatus or embedded in the electronic apparatus 10.

However, the disclosure is not limited to the foregoing embodiment. For example, the GPU 161 may further perform various graphic processes other than the foregoing processes. Further, the electronic apparatus 10 may further include an additional element for processing the graphic signal as necessary.

The GPU 161 may acquire area information and transparency information corresponding to the area information from the main processor 190 (i.e., the CPU 190), and transmit the acquired area information and the acquired transparency information to a graphic scaler 162 and a graphic quality block 163, respectively.

Here, the area information may include geometry information (data) that indicate a certain area (e.g., the first area 33) where the video frame corresponding to the graphic frame to be processed by the GPU 161 is displayed. Further, the transparency information may include an alpha value that indicates a transparency for a certain area (e.g., the first area 33) of the graphic frame (i.e., a display area of the video frame) to be processed by the GPU 161.

The graphic processor 160 may include the graphic scaler (hereinafter also referred to as a 'G Scaler') 162 so that the graphic corresponding to the second signal (i.e., the graphic signal) may be displayed on the display 110. As shown in FIG. 3, the graphic scaler 162 may be provided in a graphic plane block 164 (i.e., a GP block 164) to be controlled by the GPU 161.

According to an embodiment, the graphic scaler 162 may process the graphic signal for each frame in response to the sync signal. Here, the sync signal may, for example, be a vertical sync signal ("Vsync") for the display 110. The vertical sync signal may be provided from the main processor 190 (i.e., the CPU 190) to the graphic scaler 162 of the GP block 164 through the GPU 161.

According to an embodiment, the graphic scaler 162 may be implemented as a hardware element, for example, a chip, so that the graphic frames can be sequentially stored in and output to a buffer or a frame buffer (hereinafter also referred to as a graphic buffer). Here, the buffer may, for example, be provided in the storage 140 implemented as the DRAM or the like memory.

The graphic scaler 162 may sequentially scale and output the plurality of graphic frames based on the geometry information identified or set by the application 191 (i.e., software) installed in the electronic apparatus 10.

Specifically, the graphic scaler 162 may make the graphic frame to be output based on the start point and the end point, which are included in a preset pointer (or a rendering pointer), e.g., in the geometry information, after the graphic is rendered in the buffer by the application 191. Here, the pointer is varied, and may, for example, be set or applied with respect to the vertical sync signal ("Vsync") for the display 110. According to an embodiment, the application 191 is executed by the main processor 190, and the application 191 performs rendering for the graphic signal.

According to an embodiment, the vertical sync signal for the display 110 is provided to the graphic scaler 162 through the video scaler 152, so that the graphic frames rendered in the buffer can be sequentially output by the graphic scaler 162.

The graphic processor 160 may include the graphic quality block 163 for processing the quality of the graphic. The graphic quality block 163 may, as shown in FIG. 3, be provided in the GP block 164 to be controlled by the GPU 161.

According to an embodiment, the GP block 164 may start operating by receiving the vertical sync signal for the display 110 from the video scaler 152.

The GPU 161 may receive the alpha value, which is generated in the application 191, through the main processor 190 (i.e., the CPU 190), and transmit the alpha value to the GP block 164. Further, the GPU 161 may transmit the geometry information acquired from the main processor 190 (i.e., the CPU 190) to the GP block 164.

The graphic signal may be adjusted in the size and position of the graphic based on the geometry information by the graphic scaler 162 forming the second path (i.e., the graphic path), and also perform the graphic quality processing through the graphic quality block 163.

The electronic apparatus 10 may include the information processor 170. The information processor 170 may process data so that the area information and the transparency information corresponding to the area information can be output for each frame of the video signal processed by the video processor 150. The information processor 170 may output the area information of the video frame and the transparency information corresponding to the area information, which have been processed as above, to the mixer 180 (to be described later).

According to an embodiment, the information processor 170 may acquire the area information, for example, the geometry information from the main processor 190 (i.e., the CPU 190). The information processor 170 may generate the transparency information corresponding to the area information.

The information processor 170 may generate the transparency information corresponding to the area information of the video for each video frame by receiving data from the video processor 150. Here, the information processor 170 may receive data as a feedback from at least one of the video scaler 152 or the FRC 153, or a functional unit where the video scaler 152 and FRC 153 are combined.

In this way, the transparency information of the video frame (generated in the information processor 170) may be used by the mixer 180 to process the transparency of the corresponding graphic frame.

In the embodiment of the disclosure shown in FIGS. 3 and 4, the information processor 170 is provided as a separate element that can interface with the main processor 190 (i.e., the CPU 190) and the video processor 150. However, the disclosure is not limited to such an illustrated example. For example, according to an alternative embodiment, the information processor 170 may be implemented to be included in another element such as the video processor 150 or the main processor 190.

According to an embodiment, the information processor 170 may include a data generator 171 (see FIGS. 10 and 13) (hereinafter also referred to as an 'alpha generator') that generates a 1-bit alpha value as the transparency information based on the area information (i.e., the geometry information), and a data converter 172 (see FIGS. 10 and 13) (hereinafter also referred to as an 'alpha converter') that converts the generated 1-bit alpha value into an 8-bit value. The detailed operations of the data generator 171 and the data converter 172 will be described in relevant embodiments.

The electronic apparatus 10 according to an embodiment of the disclosure is implemented to include the information processor 170 that is configured to output the transparency information based on the video data processed through the video path. In other words, the information processor 170 is configured to output the area information of the video frame, which is an output from the video processor 150, among the plurality of video frames that is sequentially output from the video processor 150, and the transparency information corresponding to the area information to the mixer 180 (to be described later).

Accordingly, the transparency of the graphic frame may be processed corresponding to the area information of the video frame to be mixed together.

In the electronic apparatus 10 according to the foregoing embodiment of the disclosure, the transparency information may be directly output from the information processor 170 to the mixer 180, or may be transmitted to the mixer 180 via other elements such as the main processor 190. For example, the information processor 170 may transmit the transparency information to the main processor 190, and the transparency information may be transmitted through a path from the main processor 190 to the mixer 180 via the graphic processor 160.

As stated above, the electronic apparatus 10 may include the mixer 180. The mixer 180 may mix the first signal (e.g., the video signal) and the second signal (e.g., the graphic signal) so that the first image (e.g., the video) corresponding to the first signal processed by the video processor 150 and the second image (e.g., the graphic) corresponding to the second signal processed by the graphic processor 160 can be displayed on the display 110 together.

The mixer 180 may mix the first signal (e.g., the video signal or video data) and the second signal (e.g., the graphic signal or video data), in other words, make the first and second signals merge together, thereby outputting an image to be displayed on the display 110 by overlapping the video frame and the graphic frame.

According to an embodiment, the mixer 180 may be implemented as a hardware element, e.g., a chip to output the video frame overlaid with the graphic frame to the display 110. In one embodiment, the mixer 180 may be included in the video processor 150.

As shown in FIG. 3, the mixer 180 may receive the graphic signal (i.e., the graphic data) output via the GP block 164 (i.e., the graphic scaler 162 and the graphic quality block 163), and the video signal (i.e., the video data) output from the video scaler 152 or the FRC 153. The mixer 180 may synthesize the received video and graphic data, thereby overlapping the first image (e.g., the video) and the second image (e.g., the graphic).

According to an embodiment, the mixer 180 may perform an 'alpha blending' to overlap images based on the transparency information indicating the degree of transparency of the overlaid image, e.g., the second image (e.g., the graphic). The alpha blending may be performed in units of pixels.

The mixer 180 may synthesize (i.e., mix) the video signal and the graphic signal based on a predetermined algorithm with reference to the alpha value representing the transparency information. The image including the video and the graphic, which are synthesized based on the alpha value blending in the mixer 180, may be output through the display 110. Here, the mixer 180 may use various known algorithms, and is not limited to a specific method.

Figure 5:
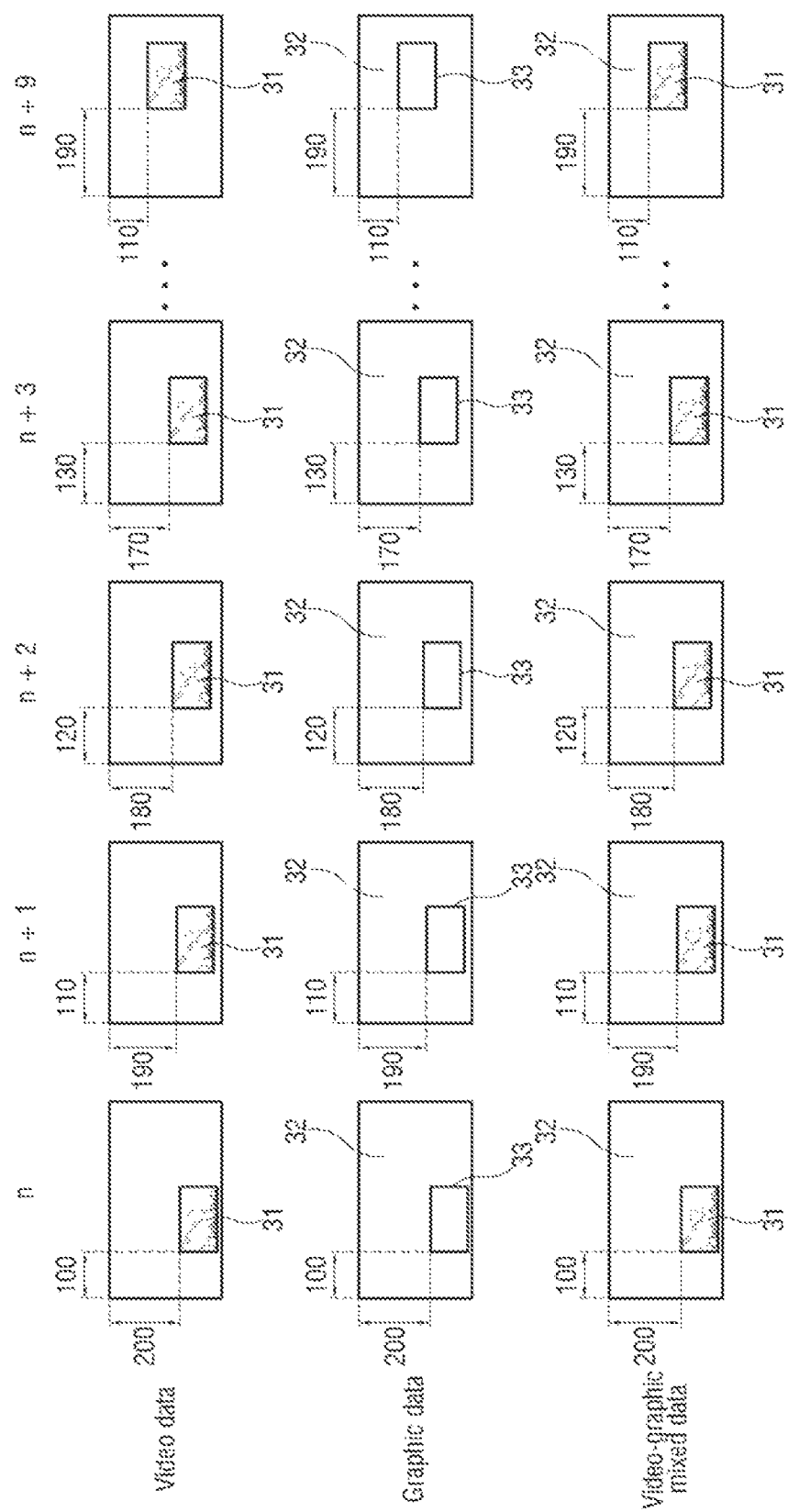
FIG. 5 illustrates an example where a video signal and a graphic signal are mixed in an electronic apparatus according to an embodiment of the disclosure.

FIG. 5 illustrates an example where a video signal and a graphic signal are mixed in an electronic apparatus according to an embodiment of the disclosure.

According to an embodiment, the mixer 180 may synthesize the video signal in a lower layer and the graphic signal in an upper layer. As described above, the first signal (e.g., the video signal) and the second signal (e.g., the graphic signal) are synthesized by the mixer 180 and then output to the display 110, so that the two images (the first image (e.g., the video) and the second image (e.g., the graphic)) can be displayed on one screen of the display 110 together.

Specifically, the mixer 180 may, as shown in FIG. 5, synthesize video data 31 and graphic data 32 for each of frames n, n+1, n+2, n+3, . . . , n+9, thereby generating mixed data (i.e., video-graphic mixed data).

For example, the mixer 180 may generate the mixed data by synthesizing the video data 31 displayed in a certain area on a screen for the nth frame and the graphic data 32 of which a certain area (e.g., a first area 33) corresponding to the video data 31 is processed to perform transparency processing (i.e., the alpha blending (e.g., an alpha value=0)). Here, the area of the video data 31 and the transparency-processed area 33 (e.g., the first area 33) of the graphic data 32 are set based on the same geometry information acquired from the main processor 190, and thus, have the same start positions of '100×200.'

When the graphic signal is a motion user experience (UX) output for a section corresponding to a predetermined number of frames, for example, a section corresponding to the nth to (n+9)th frames as shown in FIG. 5, the geometry information may be successively changed or updated for the frames. FIG. 5 illustrates an example that the geometry information is increased in a horizontal position by '10' but decreased in a vertical position by '10' in the order of frames (n, n+1, n+2, . . . n+9).

The mixed data of the frames n, n+1, n+2, n+3, . . . , n+9 generated as described above may be sequentially displayed on the display 110 as images where the videos (the video data 31) and the graphics (the graphic data 32) are overlapped. Thus, the motion UX where a certain area (e.g., the first area 33) of the graphic gradually moves rightwards and upwards and the certain area is displayed on the display 110.

Figure 6:
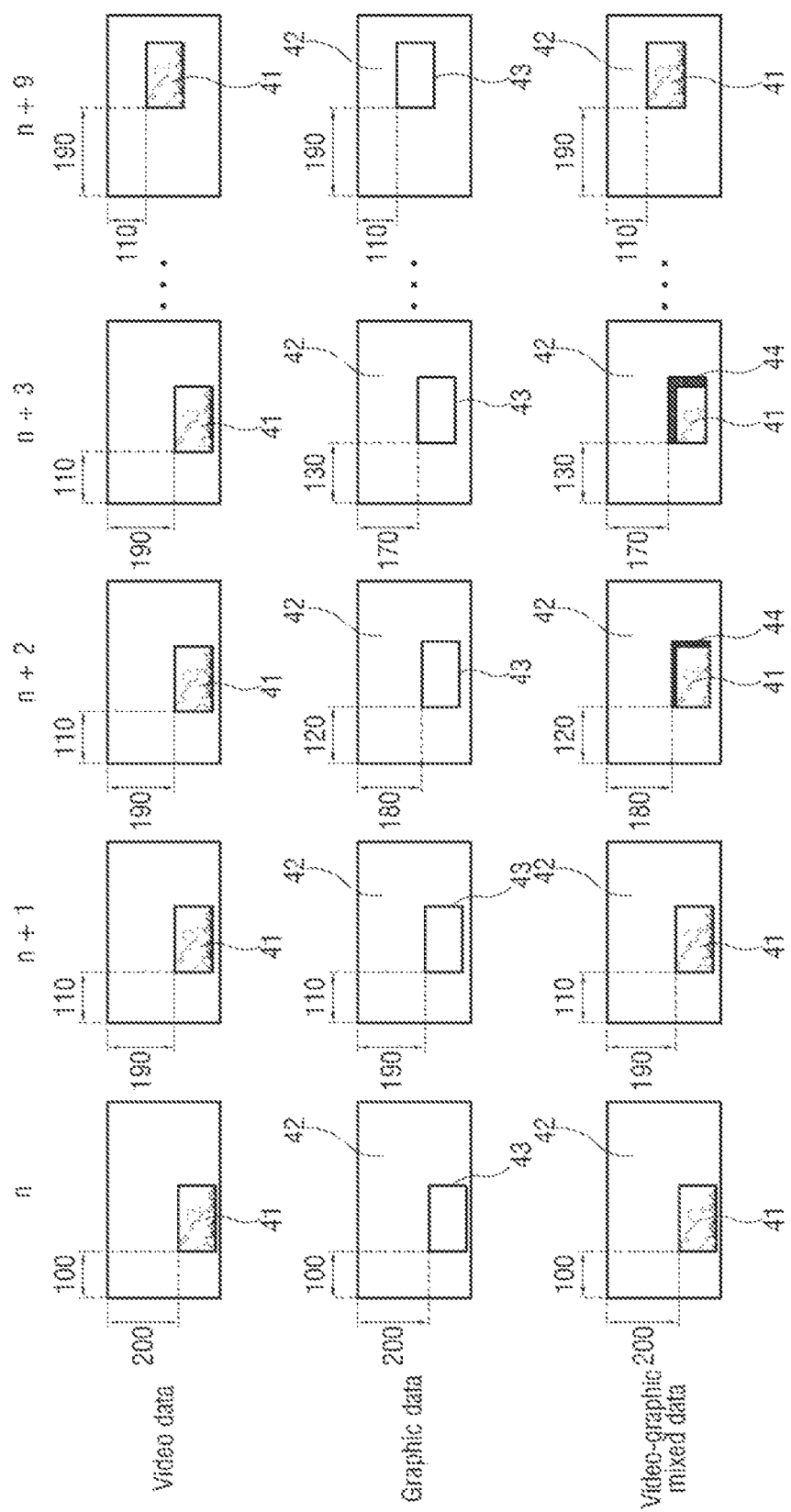
FIG. 6 illustrates an example of an image is distorted and displayed in the related art of mixing a video signal and a graphic signal.

FIG. 6 illustrates an example of an image is distorted and displayed in the related art of mixing a video signal and a graphic signal.

In the related art of FIG. 6, the alpha blending is performed for a video and a graphic based on an alpha value received through a graphic processor having a graphic path that is different from a video path of a video processor.

Because the path for processing the video signal and the path for processing the graphic signal are provided separately from each other, the video and the graphic to be mixed may not be synchronized.

The foregoing asynchronization between the video and the graphic may be caused by an unexpected delay that occurs while one of the two signals to be respectively processed by the different paths is processed, or may be caused by a difference between a speed of processing the video and a speed of processing the graphic.

In other words, although the CPU 190 transmits the geometry information to the video path and the graphic path at the same time, the video and the graphic, to which different geometries are applied as one of them is delayed, may be transmitted to the mixer 180 while the mixing is performed based on actual geometries. Further, a latency in the video path (using the video decoder and the like dedicated chip) is predictable, but a latency in the GPU using a general-purpose processor is variable. Thus, those two different latencies in the video path and the graphic path may cause a problem of asynchronization between the video data and the graphic data.

In FIG. 6, a frame delay occurs in a video signal. In the $n^{th}$ and $(n+1)^{th}$ frames, the same geometry information is applied to video data 41 and graphic data 42, so that the area of the video data 41 and the transparency-processed area 43 of the graphic data 42 can be matched, thereby outputting the mixed data (i.e., the overlapped image) without a problem.

However, when the video data 41 for the $(n+2)^{th}$ frame does not arrive as a delay occurs during a video processing process, the $(n+1)^{th}$ video data 41 may be input to the mixer 180. In this case, the mixer 180 mixes the video data 41 to which the $(n+1)^{th}$ geometry information (a start position of '110×190') is applied and the graphic data 42 to which the $(n+2)^{th}$ geometry information (a start position of '120×180') is applied. Thus, the area of the video data 41 and the transparency-processed area 43 of the graphic data 42 does not match, thereby distorting an image where some video data (e.g., for the left and the bottom) may not be displayed in the overlapped image, or a partial boundary 44 (e.g., for the right and the top) between the video and the graphic may be displayed in block or white.

Similarly, even for the $(n+3)^{th}$ frame, the mixer 180 mixes the video data 41 to which the $(n+1)^{th}$ geometry information (a start position of '110×190') is applied and the graphic data 42 to which the $(n+3)^{th}$ geometry information (a start position of '130×170') is applied, thereby causing a distorted image.

Such distorted image is regarded as a result of applying different geometry information to the video data 41 and the graphic data 42 to be overlapped.

In the electronic apparatus 10 according to an embodiment of the disclosure, the mixer 180 may adjust the transparency of the area of the graphic frame based on the area information and the transparency information of the video frame output from the information processor 170.

Referring back to FIG. 5, the mixer 180 may acquire the area information of the video data 31 for each frame and the transparency information corresponding to the area information from the information processor 170, and apply the transparency information to the received graphic data 32, thereby performing the transparency processing (i.e., the alpha blending).

Specifically, the mixer 180 may sequentially receive the video frames output from the video processor 150, and sequentially receive the graphic frames that are output from the graphic processor 160.

Here, the mixer 180 may receive the area information of the video frame, which is currently output from the video processor 150, among the plurality of video frames sequentially output from the video processor 150, and the transparency information corresponding to the area information from the information processor 170.

In addition, the mixer 180 applies the received transparency information of the current video frame to the graphic frame to be overlapped (i.e., the current graphic frame received from the graphic processor 160), in other words, performs the 'alpha blending,' thereby generating an image where the video frame and the graphic frame are overlapped.

Therefore, as shown in FIG. 5, regardless of the geometry information initially transmitted from the main processor 190 with respect to the graphic data 32 to be overlapped, the transparency-processed area 33 (e.g., the first area 33) of the graphic data 32 may match the area of the overlapped video data 31 for the frames n, n+1, n+2, n+3, . . . , n+9.

Thus, the transparency of the area of the graphic data 32 is adjusted based on the geometry information corresponding to the currently received video data 31, thereby preventing an image from being distorted due to an area mismatch of FIG. 6.

As described above, in the electronic apparatus 10 according to an embodiment of the disclosure, the mixer 180 may be implemented to perform the alpha blending for the video and the graphic based on the transparency information (i.e., the alpha value) generated in the information processor 170. For example, the mixer 180 may be designed to use only the alpha value received through the information processor 170 based on the video signal processing of the video processor 150 in order to perform the alpha blending, even though the mixer 180 has received the alpha value through the graphic processor 160.

The electronic apparatus 10 may include the main processor 190. The main processor 190 performs control for operating general elements of the electronic apparatus 10. The main processor 190 may include a control program (or an instruction) to perform such a control operation, a nonvolatile memory in which the control program is installed, a volatile memory such as a DRAM to which at least a part of the installed control program is loaded, and at least one of processors, such as a microprocessor, an application processor or a CPU, which executes the loaded control program.

The main processor 190 may include a single-core processor, a dual-core processor, a triple-core processor, a quad-core processor, or the like multiple-core processor. Further, the processor, the ROM, and the RAM are connected to one another through an internal bus.

According to an embodiment, there may be a plurality of processors. For example, the electronic apparatus 10 may include a sub processor separately provided to operate in a sleep mode where the electronic apparatus 10 receives only standby power and does not operate as an electronic apparatus.

According to an embodiment, the main processor 190 may be implemented as included in the main SoC mounted to a printed circuit board (PCB) internally provided in the electronic apparatus 10.

The control program may include a program(s) achieved by at least one of a basic input output system (BIOS), a device driver, an OS, a firmware, a platform, or an application. According to an exemplary embodiment, the application program may be previously installed or in the electronic apparatus 10 when the electronic apparatus 10 is manufactured, or may be installed in the electronic apparatus 10 on the basis of application data received from the outside when it is required in the future. The application data may, for example, be downloaded from an external server such as an application market to the electronic apparatus 10. Such an external server is merely an example of the computer program product according to the disclosure, but not limited thereto.

The control program may be recorded in a storage medium readable by a machine such as a computer. The machine-readable storage medium may be provided in the form of a non-transitory storage medium or a non-volatile storage medium. Here, the term 'non-transitory storage medium' means a tangible device and does not include a signal (e.g., an electromagnetic wave), and this term does not distinguish between a case where data is semi-permanently stored in the storage medium and a case where data is temporarily stored. For example, the 'non-transitory storage medium' may include a buffer in which data is temporarily stored.

According to an embodiment, the main processor 190 may execute the application 191 installed in the electronic apparatus 10, and identify the geometry information as the area information for displaying the first image (e.g., the video) based on the video signal and the second image (e.g., the graphic) based on the graphic signal. The main processor 190 provides such identified geometry information to the video processor 150 on the video path and the graphic processor 160 on the graphic path, and the video and the graphic respectively processed through the paths are overlapped in the mixer 180 and then output to be displayed on the display 110 together.

Figure 7:
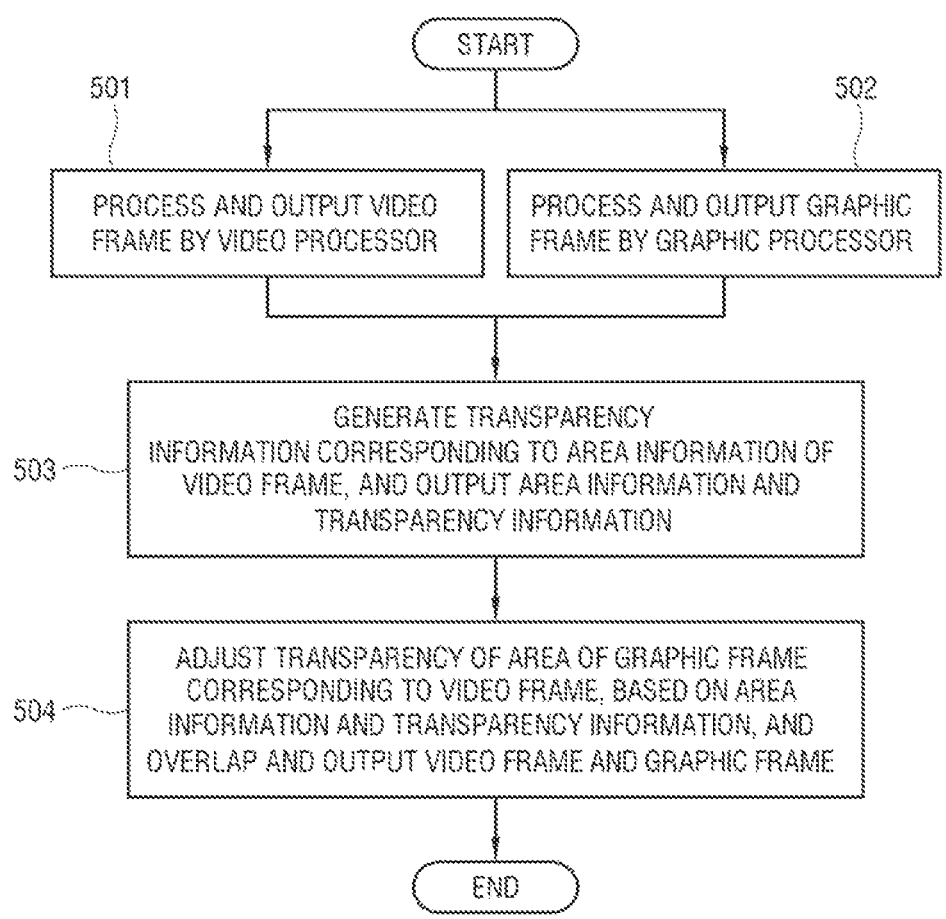
FIG. 7 illustrates control operations of overlapping and outputting a video and a graphic in an electronic apparatus according to an embodiment of the disclosure.

FIG. 7 illustrates control operations of overlapping and outputting a video and a graphic in an electronic apparatus according to an embodiment of the disclosure.

In operation 501, the electronic apparatus 10 according to an embodiment may process and output a video frame through the video processor 150.

In operation 502, the electronic apparatus 10 may process and output a graphic frame through the graphic processor 160.

Here, the operations 501 and 502 may be performed in parallel (independently) of each other. In other words, the main processor 190 of the electronic apparatus 10 may control the video processor 150 and the graphic processor 160 to process and output the video and the graphic for each frame.

Specifically, the video processor 150 may process the first signal (i.e., the video signal) in response to a sync signal, thereby outputting the first image (i.e., the video) in units of frames. Further, the graphic processor 160 may process the second signal (i.e., the graphic signal) in response to the sync signal, thereby outputting the second image (i.e., the graphic) in units of frames.

According to an embodiment, the main processor 190 provides the area information (i.e., the geometry information) for the video and graphic frames output (in units of frames) to the video processor 150 and the graphic processor 160, thereby outputting the video and graphic frames processed corresponding to the area information in the operations 501 and 502. Further, the main processor 190 may provide the area information to the information processor 170.

In operation 503, according to an embodiment, the electronic apparatus 10 may generate the transparency information (i.e., the alpha value) corresponding to the area information of the video frame through the information processor 170, and output the area information and the transparency information to the mixer 180.

In one embodiment, the information processor 170 may acquire the geometry information as the area information of the video frame from the main processor 190 (i.e., the CPU 190), and generate the transparency information corresponding to the area information of the video frame. Here, the information for identifying the video frame to be processed may be fed back from the video processor 150, for example, the video scaler 152 to the information processor 170.

Therefore, the information processor 170 may output the area information of the video frame, which is currently (e.g., at a time point) output from the video processor 150 to the mixer 180, among the plurality of video frames sequentially output from the video processor 150, and the transparency information corresponding to the area information to the mixer 180.

In operation 504, the mixer 180 may adjust the transparency of the area of the graphic frame corresponding to the video frame, based on the area information and the transparency information output in the operation 503, and overlap and output the video frame and the graphic frame of which the transparency is adjusted.

Here, the mixer 180 may acquire the video frame, the area information of the received video frame, and the transparency information corresponding to the area information, and adjust the transparency of the area of the currently received graphic frame, based on the acquired area information and transparency information.

In one embodiment, the mixer 180 may overlap and output the graphic frame, of which the transparency has been adjusted as described above, and the currently received video frame. Then, an image where the video and the graphic are overlapped can be displayed on the display 110.

Figure 8:
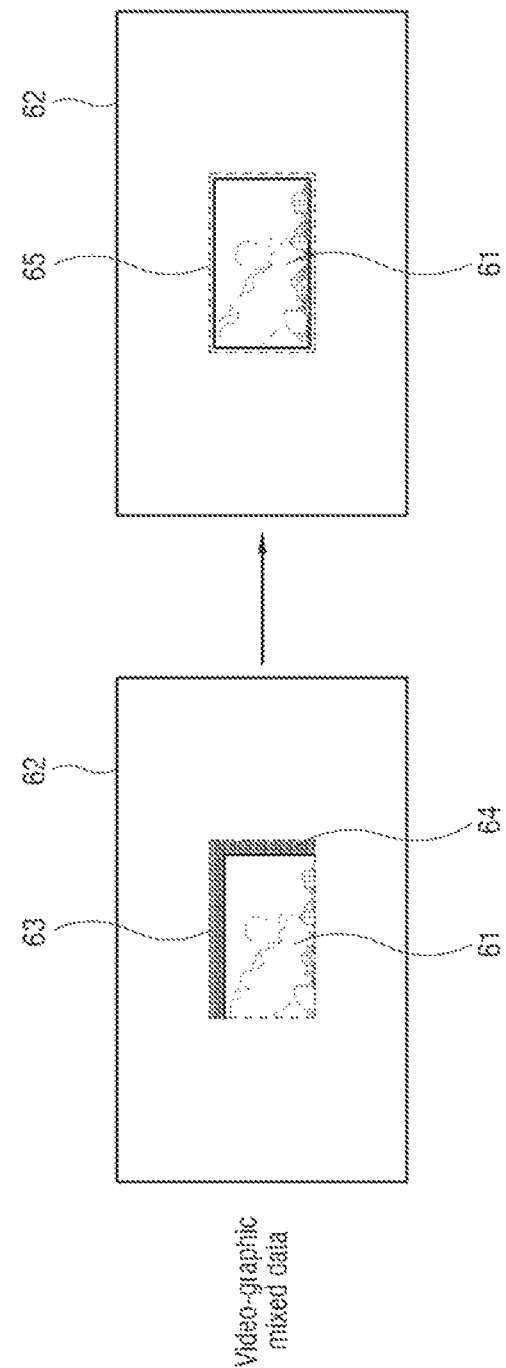
FIG. 8 illustrates an example where the transparency of a graphic frame is adjusted in an electronic apparatus according to an embodiment of the disclosure.

FIG. 8 illustrates an example where the transparency of a graphic frame is adjusted in an electronic apparatus according to an embodiment of the disclosure, and FIG. 9 illustrates mixed data for each frame, which is output from the electronic apparatus according to an embodiment of the disclosure by adjusting the transparency of the graphic frame.

As shown in FIG. 8, when a video frame 61 and a graphic frame 62 to be mixed are different in area information (i.e., geometry information) applied thereto as a delay occurs while processing a video signal, a boundary 64 may be partially displayed in black or white, or the like distorted image may be caused as the area of the video frame 61 and the transparency-processed area 63 of the graphic frame 62 are mismatched as described above with reference to FIG. 6.

In the electronic apparatus 10 according to an embodiment of the disclosure, the mixer 180 may adjust the transparency for a relevant area 65 of the graphic frame 62 (corresponding to the area of the video frame 61). Thus, the transparency of the relevant area 65 of the graphic frame 62 can be processed corresponding to the area of the video frame 61 (to be overlapped) based on the area information and the transparency information received from the information processor 170 in the operation 503.

For example, as for the $(n+3)^{th}$ frame of FIG. 6, when the video data (e.g., a start position of '110×190') and the graphic data (e.g., a start position of '130×170'), which are different in geometry information applied thereto, are input from the video processor 150 and the graphic processor 160 to the mixer 180, the mixer 180 may receive the area information of the current video data (e.g., the start position of '110×190') and the transparency information (i.e., the alpha value=0) corresponding to the area information from the information processor 170.

As shown in FIG. 8, the mixer 180 adjusts the transparency of the area 65 of the graphic frame 62 to correspond to the area of the video frame 61, based on the area information and the transparency information received from the information processor 170. The transparency-processed area 65 of the graphic frame 62, which is adjusted as described above, may match the area of the current video frame 61.

Therefore, based on the mixed data output from the mixer 180, as shown in FIG. 9, the videos Video #1 to Video #10 in the output section of the graphic displayed as the motion UX can be displayed without distortion at all output points 71, 72 and 73.

Below, detailed embodiments where images are overlapped by adjusting the transparency of the graphic in the electronic apparatus according to the disclosure will be described with reference to the accompanying drawings.

Figure 10:
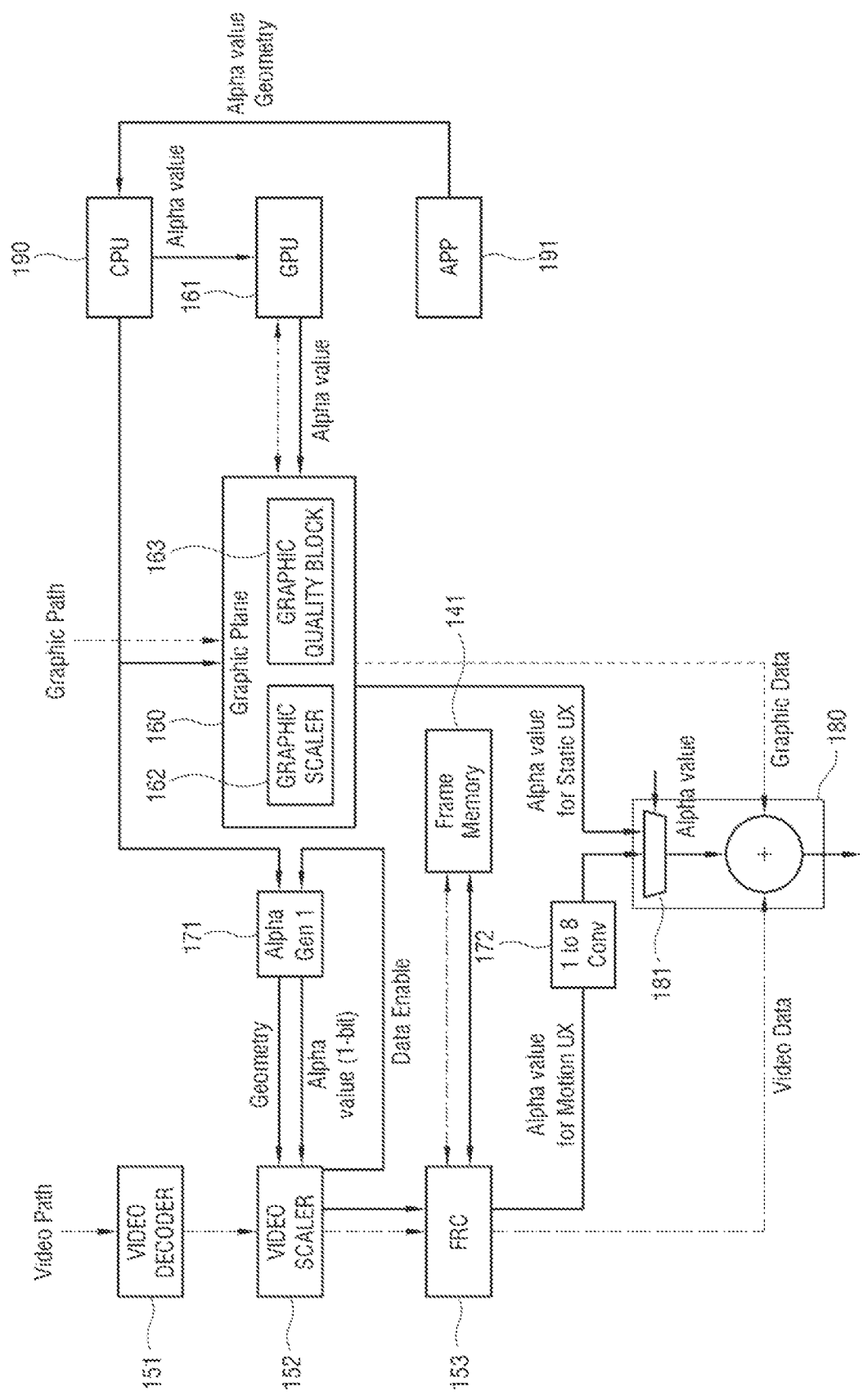
FIG. 10 illustrates a process of mixing a video signal and a graphic signal according to a first embodiment of the disclosure.

FIG. 10 illustrates a process of mixing a video signal and a graphic signal according to a first embodiment of the disclosure.

The electronic apparatus 10 according to the first embodiment shown in FIG. 10 is given as an example more specified than those in the embodiments shown in FIGS. 3 and 7. Therefore, elements assigned with the same reference numerals as those in FIG. 3 perform the same operations as those in FIG. 3, and repetitive descriptions thereof will be omitted.

In the electronic apparatus 10 according to the embodiment shown in FIG. 10, the information processor 170 may, as shown in FIG. 10, include the data generator 171 (hereinafter also referred to as an 'alpha value generator,' an 'Alpha Gen1') and the data converter 172 (hereinafter also referred to as an alpha value converter "1 to 8 Conv").

Figure 11:
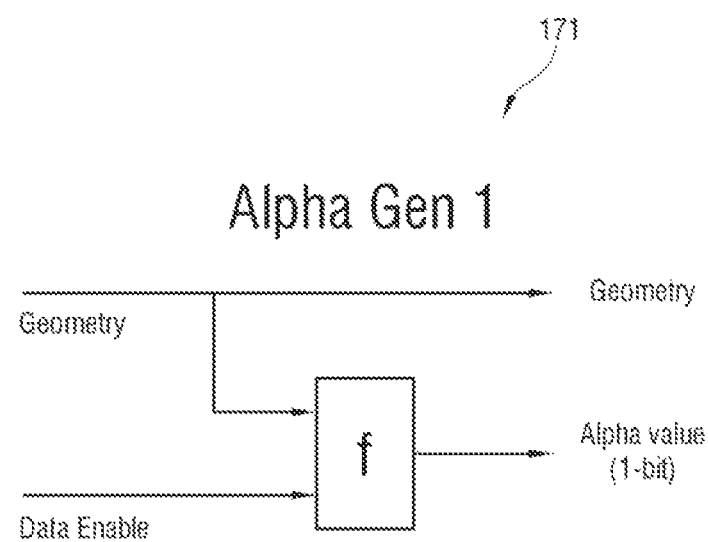
FIG. 11 illustrates an operation of a data generator in the electronic apparatus according to the embodiment of FIG. 10.

FIG. 11 illustrates an operation of a data generator 171 in the electronic apparatus according to the embodiment of FIG. 10. As shown in FIG. 11, the data generator 171 (i.e., the alpha value generator) may generate 1-bit data (i.e., an alpha value) as the transparency information based on the area information (i.e., the geometry information) of the video frame.

According to an embodiment, the data generator 171 may generate a 1-bit alpha value by a function that takes the geometry information acquired from the main processor 190 and the data 'Data Enable' of the video frame provided from the video scaler 152 as inputs.

Here, the data generator 171 may identify the video frame to be currently processed among the plurality of video frames sequentially processed in the video processor 150, based on the information or data 'Data Enable' input (or fed back) from the video scaler 152. Therefore, the data generator 171 may generate the transparency information (i.e., the alpha value) corresponding to the area information of the current video frame to match the video frame.

The 1-bit alpha value generated as above may be transmitted to the data converter 172 through the video processor 150.

The data converter 172 may convert the 1-bit alpha value into an 8-bit alpha value by the following Expression 1, and output the 8-bit alpha value to the mixer 180.

$$\alpha = \begin{cases} 0, & \alpha = 0 \\ 256, & \alpha = 1 \end{cases} \quad \text{[Expression 1]}$$

According to an embodiment, the alpha value is converted to have a value of '0' or '256' of 8 bits by the foregoing Expression 1, and thus a certain area where pixels having the alpha value of '0' in the graphic frame are positioned is processed to become transparent.

According to the embodiment shown in FIG. 10, the information processor 170 includes the data generator 171 for generating the 1-bit alpha value and the data converter 172 for converting the 1-bit value into the 8-bit value, thereby reducing load in the processes of generating and transmitting the alpha value. However, the disclosure is not limited to the foregoing embodiment, and the electronic apparatus 10 according to the disclosure may be implemented to include the information processor 170 including an alpha generator for generating the 8-bit alpha value.

In the electronic apparatus 10 according to the embodiment shown in FIG. 10, the mixer 180 may include a data selector 181 (hereinafter also referred to as an 'alpha value selector').

Figure 12:
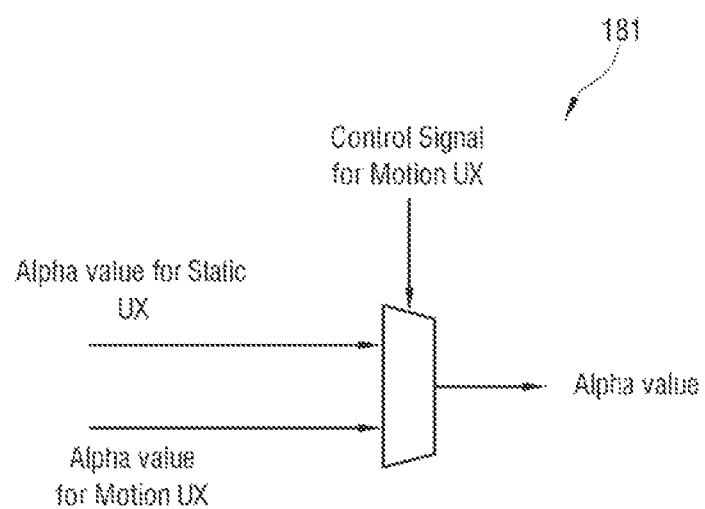
FIG. 12 illustrates an operation of a data selector in the electronic apparatus according to the embodiment of FIG. 10.

FIG. 12 illustrates an operation of a data selector in the electronic apparatus according to the embodiment of FIG. 10.

The data selector 181 (i.e., the alpha value selector) may select and output any one of a first alpha value for a motion UX and a second alpha value for a static UX, thereby allowing the mixer 180 to perform the 'alpha blending' for the transparency processing with respect to an area of the graphic frame based on the selected alpha value.

The data selector 181 may, as shown in FIG. 12, receive a control signal for selecting the alpha value (e.g., a control signal for the motion UX) from the outside, and select and output any one of the alpha value output through the data generator 171 and the data converter 172 of the information processor 170 and the alpha value transmitted through the graphic processor 160 based on the received control signal.

Here, the control signal for selecting the alpha value may, for example, be an input from the main processor 190 (i.e., the CPU 190) to the data selector 181 as the 1-bit data for indicating whether the graphic to be displayed is the motion UX or the static UX. For example, the control signal may be input as '1' when the graphic is the motion UX, and '0' when the graphic is the static UX. However, the foregoing control signal is given by way of an example, and various types of data/signals may be used as the control signal.

The data selector 181 may select the alpha value output from the information processor 170, when it is identified based on the input control signal that the graphic frame corresponds to the motion UX.

Although FIG. 10 illustrates that the mixer 180 distinguishes between the motion UX and the static UX to select the alpha value and perform the mixing, the electronic apparatus 10 according to the disclosure may be implemented to use the alpha value identified corresponding to the current video frame output from the information processor 170 in adjusting the transparency of the area of the current graphic frame, without distinguishing between the kinds/types of graphics, as described in the embodiment of FIG. 3.

The mixer 180 may adjust the transparency of the area of the graphic frame based on the selected alpha value, and may overlap and output the video frame and the graphic frame of which the transparency has been adjusted.

Therefore, as described with reference to FIG. 5, an image where the video and the graphic are overlapped is normally displayed without being distorted due to a mismatched area for each frame.

Figure 13:
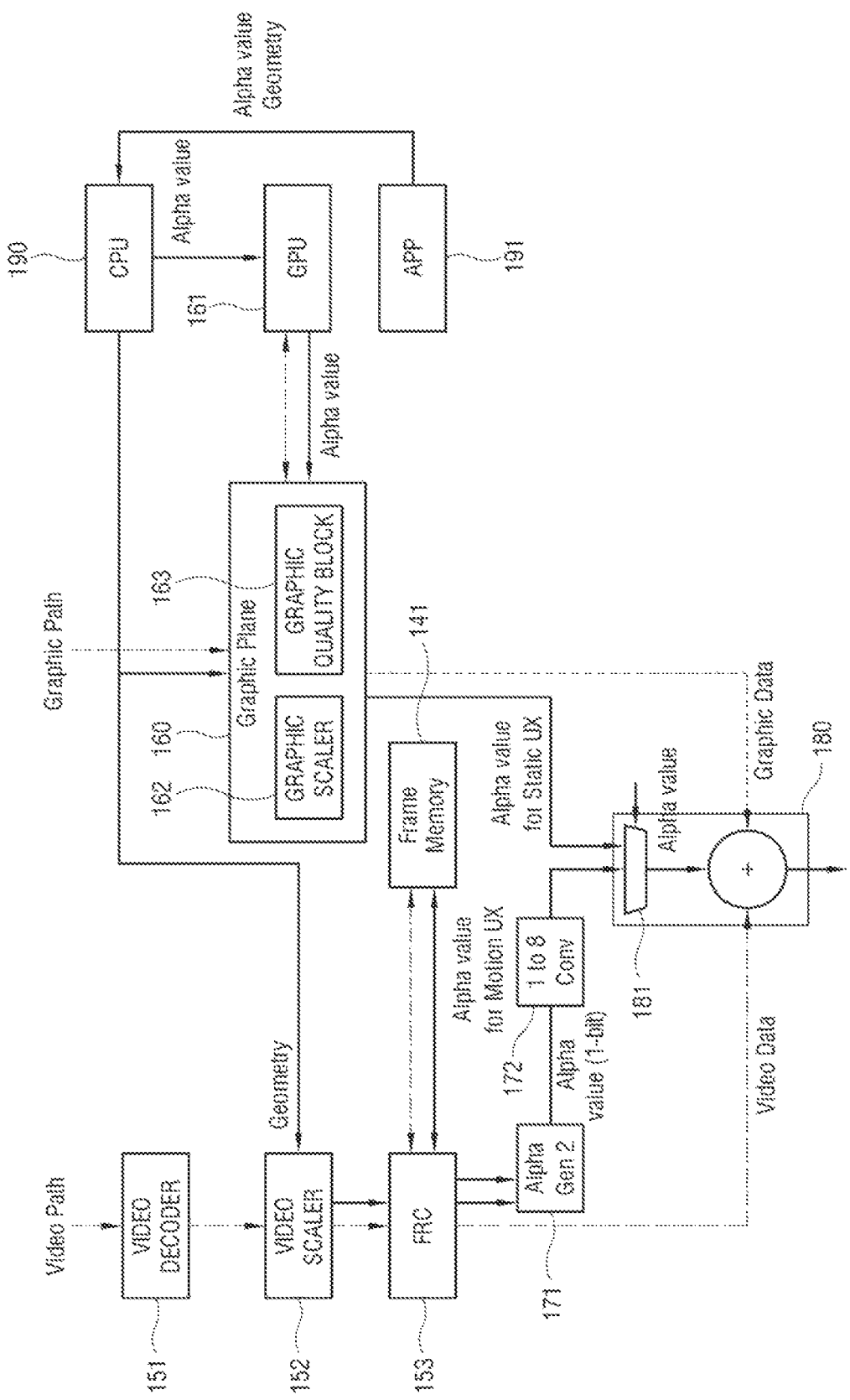
FIG. 13 illustrates a process of mixing a video signal and a graphic signal according to a second embodiment of the disclosure.

FIG. 13 illustrates a process of mixing a video signal and a graphic signal according to a second embodiment of the disclosure.

The electronic apparatus 10 according to the second embodiment shown in FIG. 13 is given as an example more specified than those in the embodiments shown in FIGS. 3 and 7. The second embodiment of FIG. 13 and the first embodiment of FIG. 10 have in common that the information processor 170 is provided to output the area information of the video frame and the transparency information corresponding to that area information. Therefore, elements assigned with the same reference numerals as those in FIGS. 3 and 10 perform the same operations as those in FIGS. 3 and 10, and repetitive descriptions thereof will be omitted.

As shown in FIG. 13, in the electronic apparatus according to the embodiment shown in FIG. 13, the information processor 170 includes the data generator 171 ("Alpha Gen2") and the data converter 172 ("1 to 8 Conv") like those in the embodiment of FIG. 10, but, differently, the data generator 171 ("Alpha Gen 2") is provided at the output terminal of the video processor 150.

The data generator 171 may, as described with reference to FIG. 11, generate a 1-bit alpha value as the transparency information based on the area information (i.e., the geometry information) of the video frame.

Here, the geometry information may be transmitted from the main processor 190 to the data generator 171 via the video scaler 152 and the FRC 153.

According to an embodiment, the data generator 171 may generate the 1-bit alpha value based on a function that takes the geometry information transmitted (as described above) and the data of the video frame as inputs. The data generator 171 may identify the output video frame, and may generate the transparency information (i.e., the alpha value) corresponding to the area information of the identified video frame to match that video frame.

The 1-bit alpha value generated as above is output to the data converter 172 ("1 to 8 Conv"), and then, the data converter 172 converts the 1-bit alpha value (first transparency information) into an 8-bit alpha value (second transparency information) by the Expression 1, thereby outputting the 8-bit alpha value to the mixer 180.

In the electronic apparatus 10 according to the embodiment of FIG. 13, the mixer 180 may include the data selector 181 (i.e., the alpha value selector) as described in the embodiment of FIG. 10.

The data selector 181 may select and output any one of the first alpha value for the motion UX and the second alpha value for the static UX, so that the mixer 180 can perform the alpha blending for the transparency processing with respect to the area of the graphic frame based on the selected alpha value.

The data selector 181 may receive a control signal for selecting the alpha value (e.g., a control signal for the motion UX), and select and output any one of the alpha value output through the information processor 170 (i.e., the data generator 171 and the data converter 172) and the alpha value transmitted through the graphic processor 160 based on the received control signal.

The mixer 180 may adjust the transparency of the area of the graphic frame based on the selected alpha value, and overlaps and outputs the video frame and the graphic frame of which the transparency has been adjusted.

Therefore, as described with reference to FIG. 5, an overlapped image may be displayed without being distorted due to a mismatched area for each frame.

Figure 14:
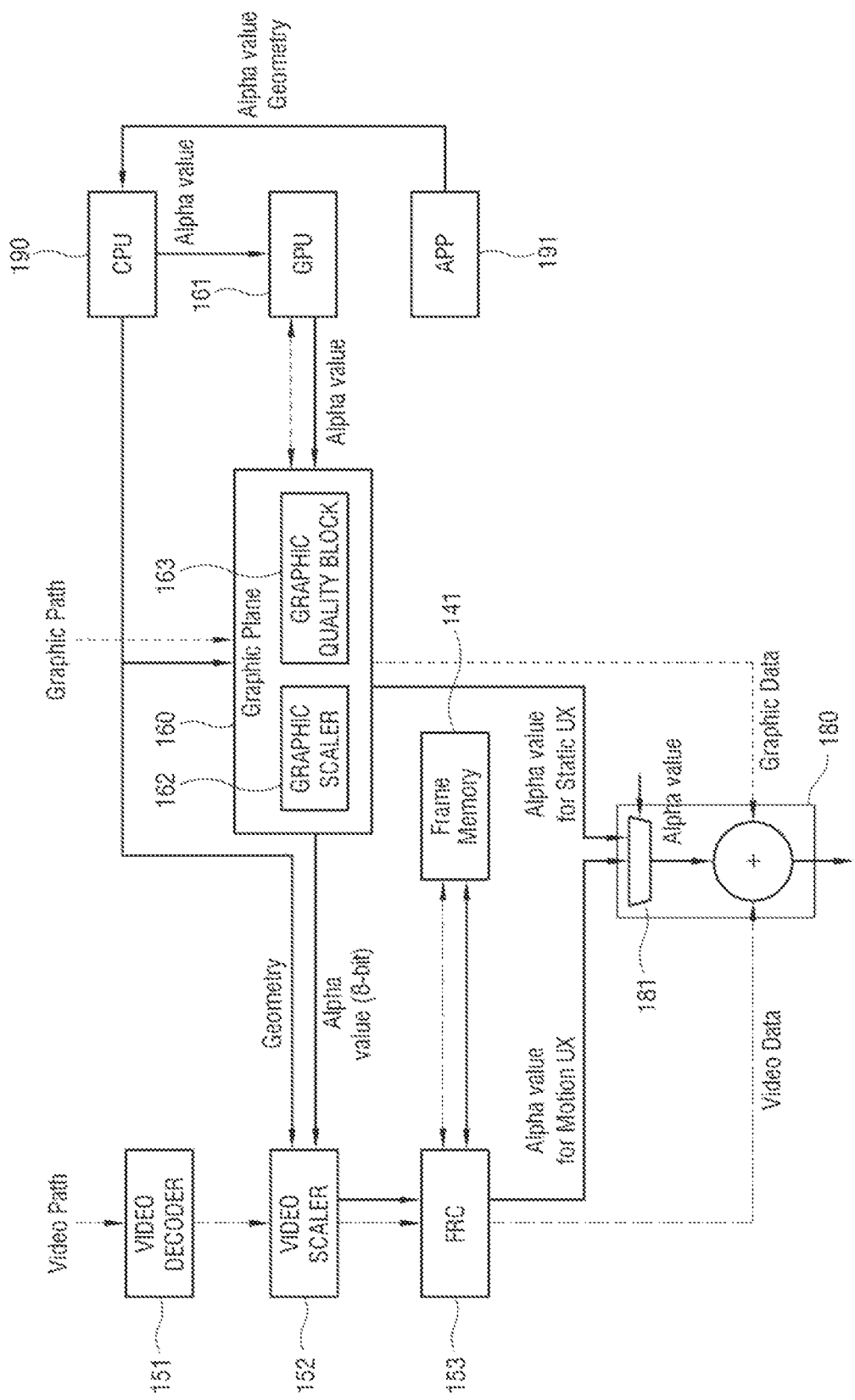
FIG. 14 illustrates a process of mixing a video signal and a graphic signal according to a third embodiment of the disclosure.

FIG. 14 illustrates a process of mixing a video signal and a graphic signal according to a third embodiment of the disclosure.

The electronic apparatus 10 according to the third embodiment shown in FIG. 14 and those in the embodiments shown in FIGS. 3 and 7 have in common that the transparency information (i.e., the alpha value) is applied based on the video frame. Therefore, elements assigned with the same reference numerals as those in FIGS. 3 and 10 perform the same operations as those in the embodiment of FIGS. 3 and 10, and repetitive descriptions thereof will be omitted.

The electronic apparatus 10 according to the third embodiment is as shown in FIG. 14 different from those in the embodiment of FIGS. 10 and 13 in that the information processor 170 (in FIG. 3) for outputting the alpha value is not separately provided and the 8-bit alpha value (not a 1-bit alpha value) is provided from the graphic processor 160 to the video processor 150.

Specifically, in FIG. 14, the video scaler 152 of the video processor 150 may receive the area information (i.e., the geometry information) from the main processor 190 (i.e., the CPU 190), and receive the transparency information (i.e., the 8-bit alpha value) from the GP block 164 of the graphic processor 160. Here, the alpha value may be generated as the transparency information together with the geometry information by executing the application 191 through the main processor 190, and the alpha value may be transmitted from the main processor 190 to the GPU 161, thereby being output to the video scaler 152 through the GP block 164. However, such transmission path is merely an example, and the video scaler 152 may acquire the alpha value directly from the main processor 190 or the GPU 161.

The 8-bit alpha value input to the video scaler 152 may be output to the mixer 180 via the FRC 153 or directly. Here, the video frame, the area information for the video frame, and the transparency information (i.e., the alpha value) corresponding to the area information are matched and output to the mixer 180 together.

In the electronic apparatus 10 according to the third embodiment of FIG. 14, the mixer 180 may include the data selector 181 (i.e., the alpha value selector), as described above in the embodiments of FIGS. 10 and 13.

The data selector 181 may select and output any one of the first alpha value for the motion UX and the second alpha value for the static UX, so that the mixer 180 can perform the alpha blending for the transparency processing with respect to the area of the graphic frame based on the selected alpha value The data selector 181 may receive a control signal for selecting the alpha value (e.g., a control signal for the motion UX), and select and output any one of the alpha value transmitted through the video processor 150 and the alpha value transmitted through the graphic processor 160 based on the received control signal.

Here, the control signal for selecting the alpha value may, for example, be received from the main processor 190 (i.e., the CPU 190) as the 1-bit data indicating whether the graphic to be displayed is the motion UX or the static UX.

For example, the control signal may be input to the data selector 181 as '1' when the graphic is the motion UX, and as 'O' when the graphic is the static UX. However, the foregoing control signal is given by way of example, and various types of data/signals may be used as the control signal.

FIG. 13 illustrates that the mixer 180 distinguishes between the motion UX and the static UX to select the alpha value and perform the mixing. The electronic apparatus 10 according to the disclosure may be implemented to use the transparency information (i.e., the alpha value) identified corresponding to the area information of the current video frame in adjusting the transparency of the area of the graphic frame to be overlapped, without distinguishing between the kinds/types of graphics, as described in the embodiment of FIG. 3

The mixer 180 may adjust the transparency of the area of the graphic frame based on the selected alpha value, and may overlap and output the video frame and the graphic frame of which the transparency has been adjusted.

Therefore, as described with reference to FIG. 5, an image where the video and the graphic are overlapped is displayed without being distorted due to a mismatched area for each frame.

In the foregoing embodiments, the transparency is adjusted corresponding to the area information of the currently output video frame with respect to a certain area (e.g., the first area) of the graphic frame, thereby preventing the overlapped image from being distorted even when the output video and graphic are not synchronized.

According to another embodiment of the disclosure, the electronic apparatus 10 may control (or synchronize) the video frame and the graphic frame corresponding to each other to be output together under control of software executed by the main processor 190 (i.e., the CPU 190) without additionally including a separate element such as the information processor 170, thereby preventing asynchronization.

Figure 15:
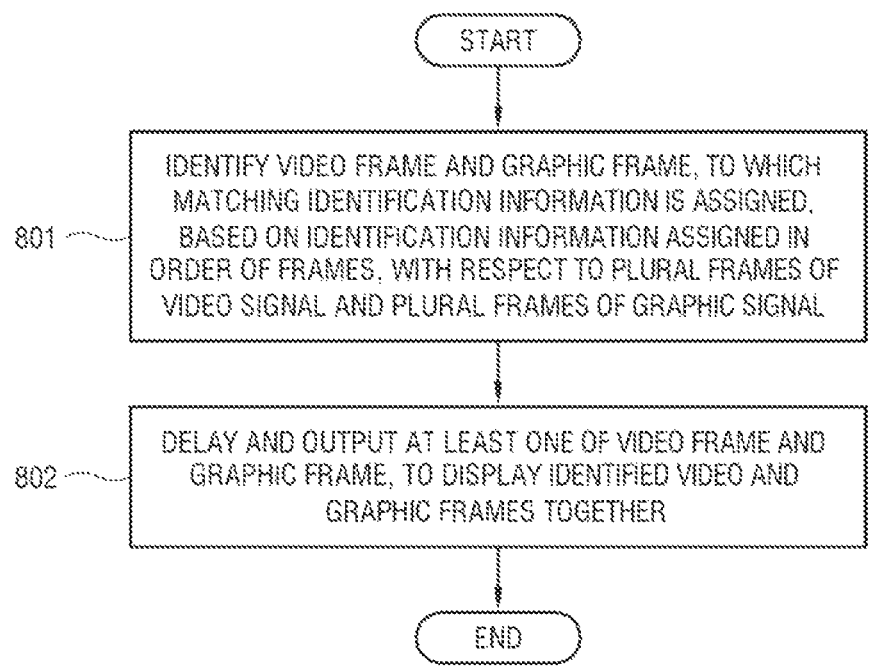
FIG. 15 illustrates control operations of synchronizing and outputting a video and a graphic in an electronic apparatus according to an embodiment of the disclosure.

FIG. 15 illustrates control operations of synchronizing and outputting a video and a graphic in an electronic apparatus according to an embodiment of the disclosure.

According to an embodiment, the video processor 150 and the graphic processor 160 of the electronic apparatus 10 may process and output the video and the graphic for each frame in response to the vertical sync signal ("Vsync"), respectively. Specifically, the video processor 150 may process the first signal (i.e., the video signal) in response to the sync signal, so that the first image (i.e., the video) can be output in units of frames. Further, the graphic processor 160 processes the second signal (i.e., the graphic signal) in response to the sync signal, so that the second image (i.e., the graphic) can be output in units of frames.

The two images (the first image (e.g., the video) and the second image (e.g., the graphic)) that are output from the video processor 150 and the graphic processor 160 are mixed in the mixer 180 and displayed on the display 110 together.

As shown in FIG. 15, in operation 801, the main processor 190 may identify a plurality of frames of the video signal, and the video frame and the graphic frame, which are assigned with the corresponding identification information, based on the identification information assigned in order of frames, with respect to the plurality of frames.

Here, the identified video frame and graphic frame become a pair of frames respectively corresponding to the video and the graphic to be displayed on the display 110 together. For example, a certain frame V1 among the plurality of frames of the video signal and a certain frame G1 to be displayed together with the frame V1 among the plurality of frames of the graphic signal may be identified as a pair of frames.

In operation 802, the main processor 190 may control at least one of the video frame V1 and the graphic frame G1 to be delayed and output so that the pair of frames identified in the operation 801 (i.e., the video frame V1 and the graphic frame G1) can be displayed on the display 110 together.

Below, embodiments where the video and the graphic are synchronized and output by delaying at least one of the video and the graphic in the electronic apparatus according to the disclosure will be described with reference to the accompanying drawings.

Figure 16:
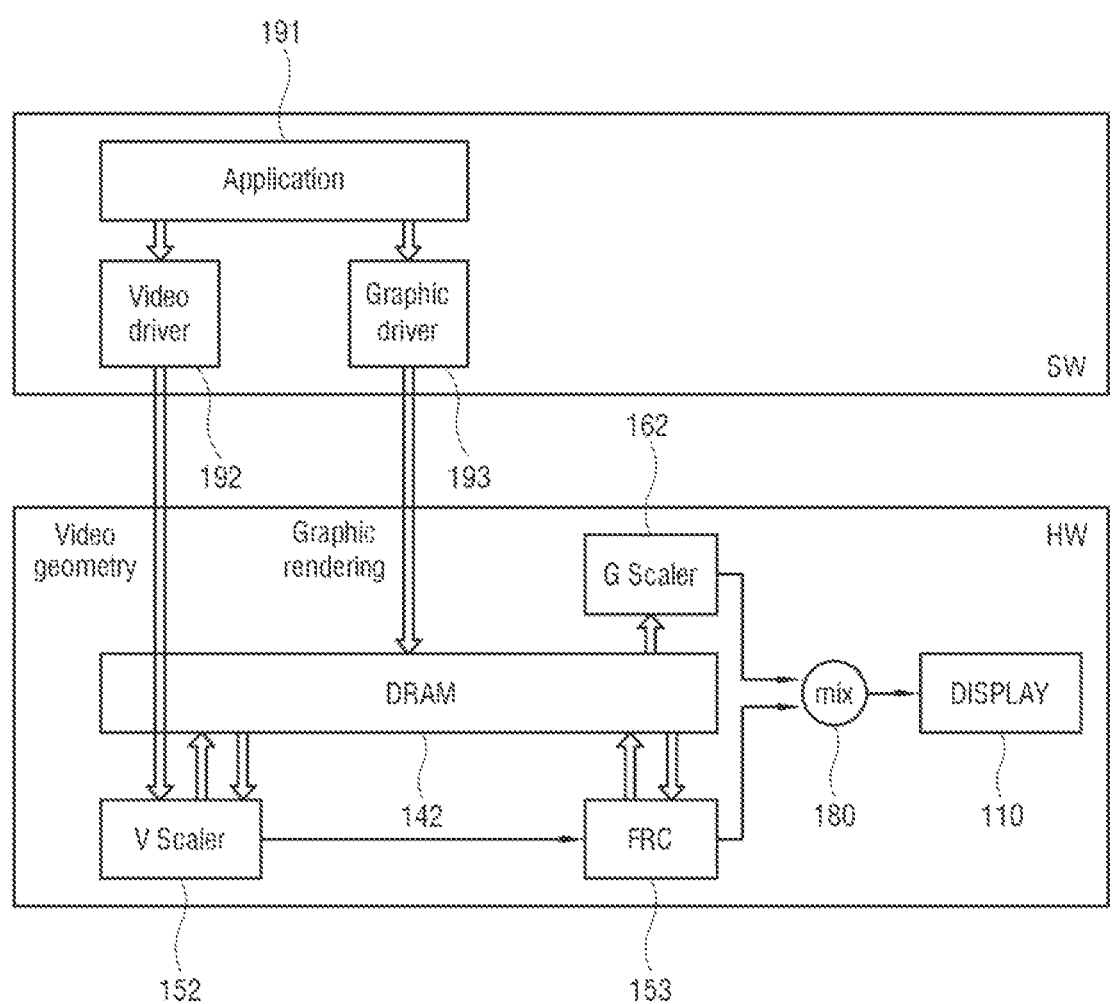
FIG. 16 illustrates control operations for displaying a video and a graphic together in an electronic apparatus according to an embodiment of the disclosure.

FIG. 16 illustrates control operations for displaying a video and a graphic together in an electronic apparatus according to an embodiment of the disclosure.

In the electronic apparatus 10 according to an embodiment, as shown in FIG. 16, a video driver 192 and a graphic driver 193 as software in the layer of the application 191 are executed by the main processor 190, so that information can be transmitted to the video scaler ("V Scaler") 152 and the graphic scaler ("G Scaler") 162.

The video driver 192 may, for example, set a video geometry for representing the first image (e.g., the video), and transmit the set geometry information to the video scaler 152. Here, the geometry information may include the size information and the position information for the video.

The graphic driver 193 may, for example, perform graphic rendering (image rendering) for displaying the second image (e.g., the graphic) in the buffer of the memory 142, and set a buffer pointer so that the set pointer information can be transmitted to the graphic scaler 162. Here, the pointer information includes information about a start point and an end point for the graphic, and the frames of the rendered graphic are controlled to be output in sequence between the start point and the end point.

The video scaler 152 may scale the frames (i.e., the video frames) of the first signal (i.e., the video signal) processed by the video decoder 151 based on the set geometry, and output the scaled frames to the mixer 180.

According to an embodiment, the video frame scaled by the video scaler 152 may be processed for the FRC in the FRC 153, and then, be output to the mixer 180. In other words, the video frame output from the video scaler 152 may be transmitted to the FRC 153, may be processed for the FRC by the FRC 153, and provided to the mixer 180 so as to be mixed with the graphic frame.

The graphic scaler 162 may output the frames (i.e., the graphic frames) of the second signal (i.e., the graphic signal), which has been rendered in the buffer, to the mixer 180.

The mixer 180 may mix the video frame provided from the video scaler 152 or the FRC 153 and the graphic frame provided from the graphic scaler 162 and outputs the mixed data to the display 110, so that a corresponding image where the video and the graphic are overlapped can be displayed on the display 110 together.

The foregoing operations of processing and mixing the video and the graphic and transmitting the information may be equally performed in the embodiments related to FIGS. 15 and 18 (to be described later).

Figure 17:
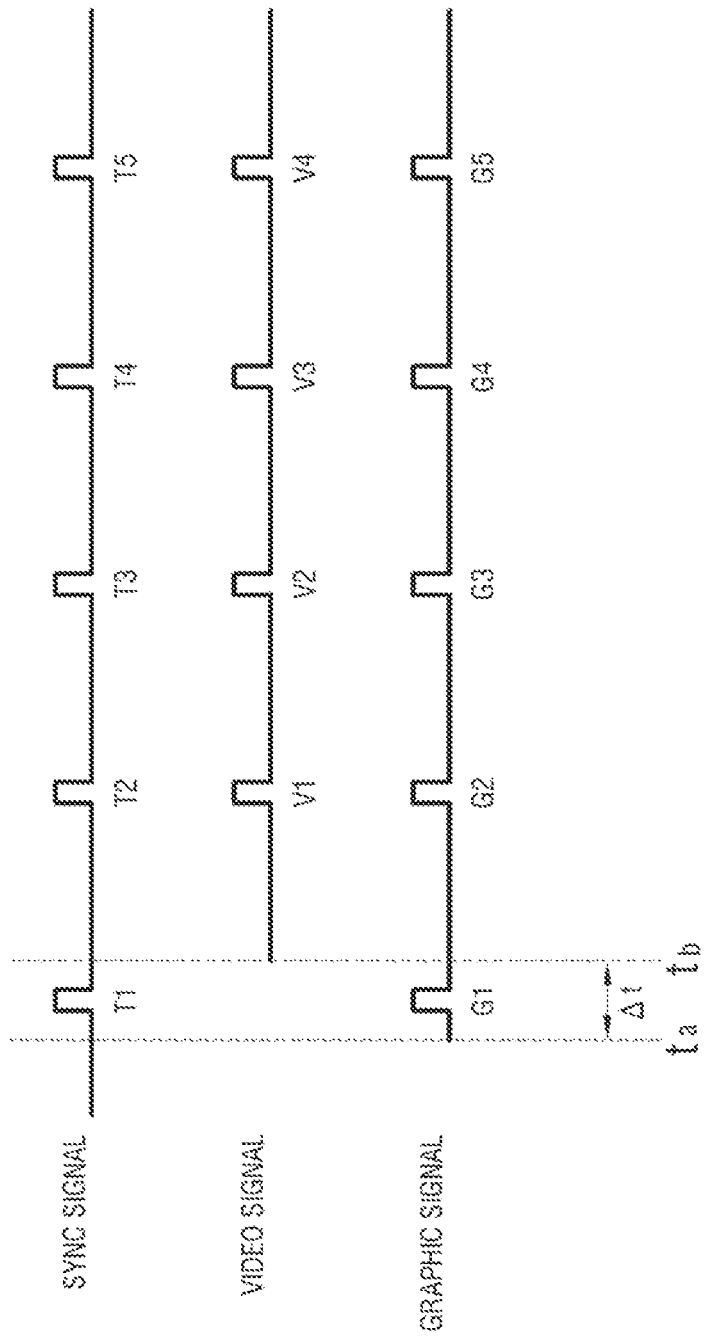
FIG. 17 illustrates a case where an image is distorted in the related art of displaying a video and a graphic together.

FIG. 17 illustrates a case where an image is distorted in the related art of displaying a video and a graphic together.

In the related art shown in FIG. 17, the video signal and the graphic signal may be individually processed for each frame in response to a predetermined sync signal. Here, the sync signal may employ a vertical sync signal ("Vsync") for the display 110 where an image is displayed.

However, although the geometry is simultaneously set for the video signal and the graphic signal in the layer of the application 191, one of both signals may be delayed, and therefore the data of that signal, e.g., the video signal may arrive at the video scaler 152 later than the first vertical sync signal for the display 110.

Referring to FIG. 17, as the data of the graphic signal arrives at a point in time $t_a$, the graphic scaler 162 may control the first graphic frame G1 to be output at a point in time of the first pulse of the vertical sync signal (i.e., at a timing T1).

However, when the data of the video signal is delayed by a predetermined period of time Δt as compared with the graphic signal and arrives at a point in time $t_b$ after the first pulse T1, as shown in FIG. 17 the video scaler 152 controls the first video frame V1 to be output at a timing T2 corresponding to the second pulse of the vertical sync signal. In this case, the graphic scaler 162 may control the second graphic frame G2 to be output at the same timing T2 corresponding to the second pulse.

In other words, it is impossible for the related art of FIG. 17 to identify whether the video frame and the graphic frame output at the same time correspond to each other, and therefore the video frame V1 and the graphic frame G1 to be displayed on one screen are output at different points in time.

Therefore, the video frame V1 and the graphic frame G2, which do not correspond to each other, are output at the same time, and thus a synchronization failure (or a mismatch) between the video and the graphic occurs, thereby causing a distorted image.

For example, such a synchronization failure may occur in an out-of-box experience (OOBE) (i.e., initialization process) after a consumer purchases a TV, or in an authentication process for the YouTube App installed in the TV.

For example, in the process of gradually expanding the area f the video while the video and the graphic are simultaneously displayed on the screen in the final stage of the OOBE, the boundary between the video and the graphic may be displayed in block or white (i.e., may be distorted) as shown in FIG. 6.

In the electronic apparatus 10 according to an embodiment of the disclosure, synchronization processing is performed to prevent the foregoing image distortion.

Figure 18:
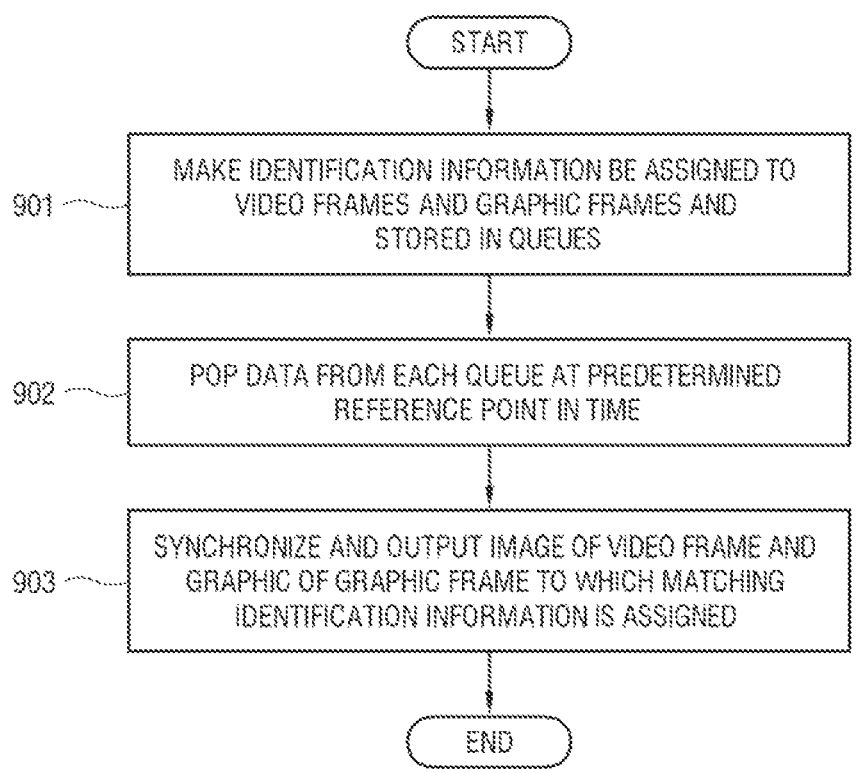
FIG. 18 illustrates control operations for synchronizing and displaying an image in an electronic apparatus according to an embodiment of the disclosure.
Figure 19:
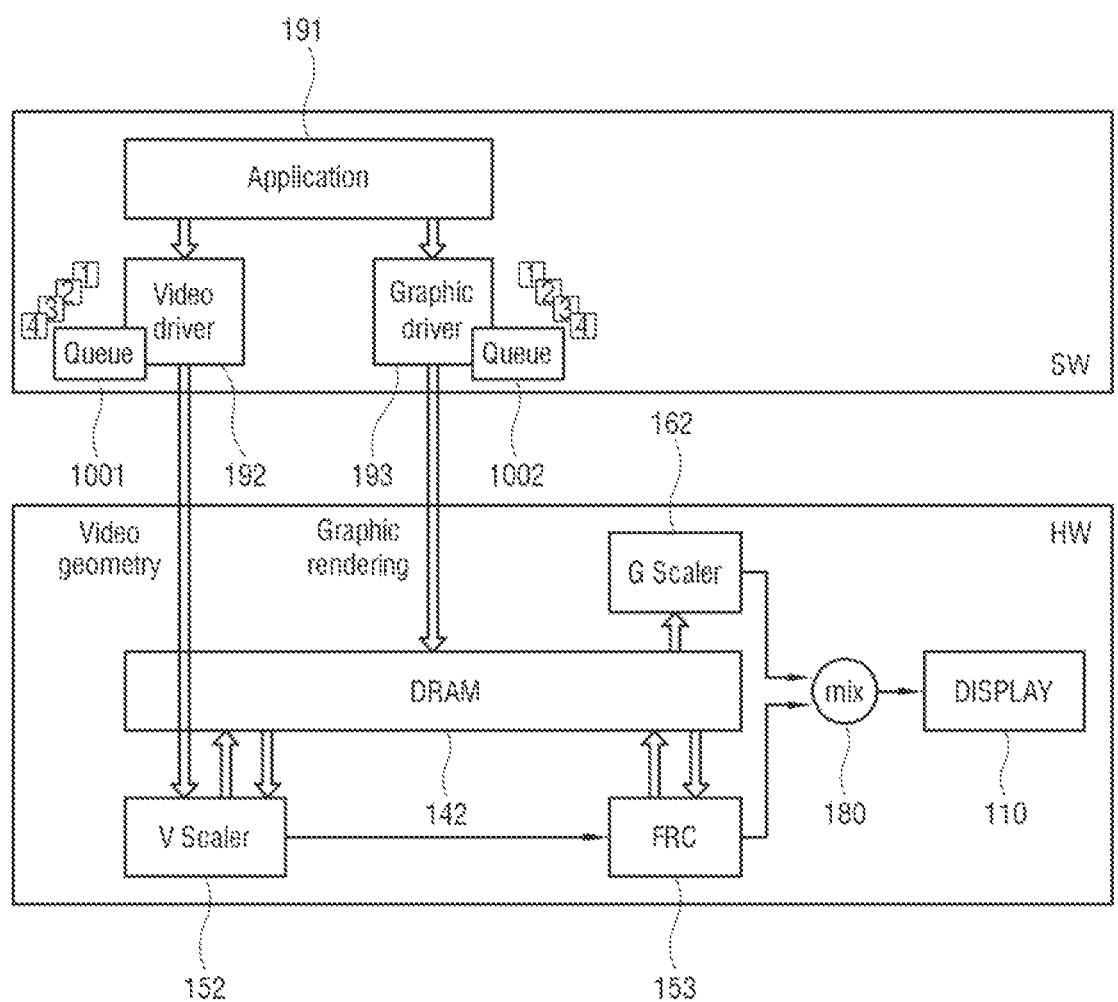
FIG. 19 illustrates operations of elements for synchronizing and displaying an image according to the embodiment of FIG. 18.

FIG. 18 illustrates control operations for synchronizing and displaying an image in an electronic apparatus according to an embodiment of the disclosure, and FIG. 19 illustrates operations of elements for synchronizing and displaying an image according to the embodiment of FIG. 18.

The embodiment shown in FIG. 18 is an example more specified than the embodiment shown in FIG. 15. In other words, like the embodiment of FIG. 15, the embodiment of FIG. 18 is characterized in that at least one of the video frame and the graphic frame is controlled to be delayed by identifying a pair of frames to be displayed together based on identification information, e.g., sequence numbers assigned in order of frames, assigning identification numbers to the video frame and the graphic frame, storing data of video and graphic frames assigned with the identification numbers in a queue, and popping the stored data.

According to an embodiment, the electronic apparatus 10 may operate in a synchronization mode for the video and the graphic, thereby controlling the synchronization processing (to be described later) to be performed. The electronic apparatus 10 may operate in the synchronization mode based on a user's input received through the user input interface 130.

The main processor 190 of the electronic apparatus 10 may, as shown in FIG. 18, assign numbers (i.e., sequence numbers) as the identification information to the video signals (i.e., the plurality of video frame) and the graphic signals (i.e., the plurality of graphic frames), and store the data of the video signals and the data of the graphic signals, which are assigned with the numbers for each frame, in the respective queues (in operation 901). Here, the queue is configured to store data by a first in first out (FIFO) structure, and therefore each data of the video frame and the graphic frame may be sequentially stored in each queue and then output.

In operation 901, the main processor 190 may assign the video signal and the graphic signal with identification information for each frame based on the execution (i.e., start) of the synchronization mode, and control the data of the video frame and the graphic frame, for example, information about the size and position of the video and information about the rendering pointer of the graphic as the geometry information to be sequentially stored (i.e., enqueued) along with the numbers assigned thereto.

Referring to FIG. 19, the video driver 192 executed by the main processor 190 may assign sequence numbers such as 1, 2, 3, and 4, . . . as the identification information to the video frames of the video signal and store the relevant data or information in a first queue 1001 provided as a video geometry queue. Likewise, the graphic driver 193 executed by the main processor 190 may assign sequence numbers such as 1, 2, 3, 4, . . . as the identification number to the frames of the graphic signal and store the relevant data or information in a second queue 1002 provided as a graphic pointer queue. Therefore, the video frame and the graphic frame, which are assigned with the same identification information (i.e., the sequence number), may be displayed on the display 110 together as a pair of frames corresponding to each other to be overlapped in the mixer 180.

In operation 092, the video driver 192 and the graphic driver 193 executed by the main processor 190 may control the data to be simultaneously popped, Here, the reference point in time may be set based on a predetermined sync signal, and may, for example, be the timing T1 of the first pulse of the vertical sync signal ("Vsync") for the display 110 as an interrupt service routine (ISR).

In other words, according to the embodiment shown in FIG. 19, for example, the data of the video frame V1 stored in the first queue 1001 and the data of the graphic frame G1 stored in the second queue 1002 may be controlled to be simultaneously popped (i.e., dequeued or outputted) from the respective queues (the first queue 1001 and the second queue 1002) at the reference point in time as a pair of frames assigned with the matching identification information.

Therefore, the data of the video frame and the data of the graphic frame are simultaneously and popped from the first queue 1001 and the second queue 1002 at the reference point in time, and transmitted to the video scaler 152 and the graphic scaler 162, respectively.

Here, the video driver 192 may provide the geometry information (i.e., a video geometry) set for the popped video frame to the video scaler 152, and the graphic driver 193 may perform the graphic rendering for the popped graphic frame and provide information about a buffer pointer as the geometry information to the graphic scaler 162.

According to an embodiment, the main processor 190 compares the pieces of identification information (i.e., the sequence numbers) respectively assigned to the video frame and the graphic frame popped at the reference point in time, and control the data to be transmitted to the video scaler 152 and the graphic scaler 162 based on a correspondence (i.e., a match) between the two pieces of identification information (numbers).

In other words, when it is identified that the video frame and the graphic frame simultaneously popped from the queues (the first queue 1001 and the second queue 1002) match each other based on a result of comparing the sequence numbers, the main processor 190 may control the video geometry information and the buffer pointer information to be respectively transmitted as the geometry information to the video scaler 152 and the graphic scaler 162 and set.

In addition, in operation 903, the main processor 190 may control the video processor 150 and the graphic processor 160 to synchronize and output an image of the video frame V1 and an image of the graphic frame G1, which are assigned with the matching identification information (sequence numbers) and transmitted in operation 902.

Here, the main processor 190 may, for example, control the video frame V1 and the graphic frame G1 to be respectively synchronized and output from the video scaler 152 and the graphic scaler 162 at the timing T2 of the next pulse of the vertical sync signal ("Vsync"), and then provided to the mixer 180.

In foregoing the embodiment, the data is simultaneously popped in the state that the data is stored in both the first queue 1001 and the second queue 1002, and thus, the video frame and the graphic frame are necessarily controlled to be synchronized and output as a pair.

In this process, at least one of the video frame V1 and the graphic frame G1 may be controlled to be intentionally delayed. For example, when the video decoder 151 of the video processor 150 forming the video path outputs the video frame V1 to the video scaler 152 late, the graphic scaler 162 of the graphic processor 160 forming the graphic path may delay the output of the graphic frame G1. In other words, the graphic scaler 162 may receive the geometry information (i.e., the rendering pointer information) as the data of the graphic frame G1 from the queue 1002, and output the graphic frame G1 based on the received geometry information, and in this process the graphic frame G1 is intentionally delayed.

Therefore, as shown in FIG. 17, although any one of the frames, for example, the graphic frame G1 arrives early, the graphic frame G1 is controlled to be delayed so that the matching video frame V1 arriving late can be synchronized and output with the graphic frame G1, thereby preventing an image from being distorted as the mismatched video and graphic are displayed together.

According to an embodiment, the video frame scaled by the video scaler 152 may be output to the mixer 180 via the FRC 153.

Figure 20:
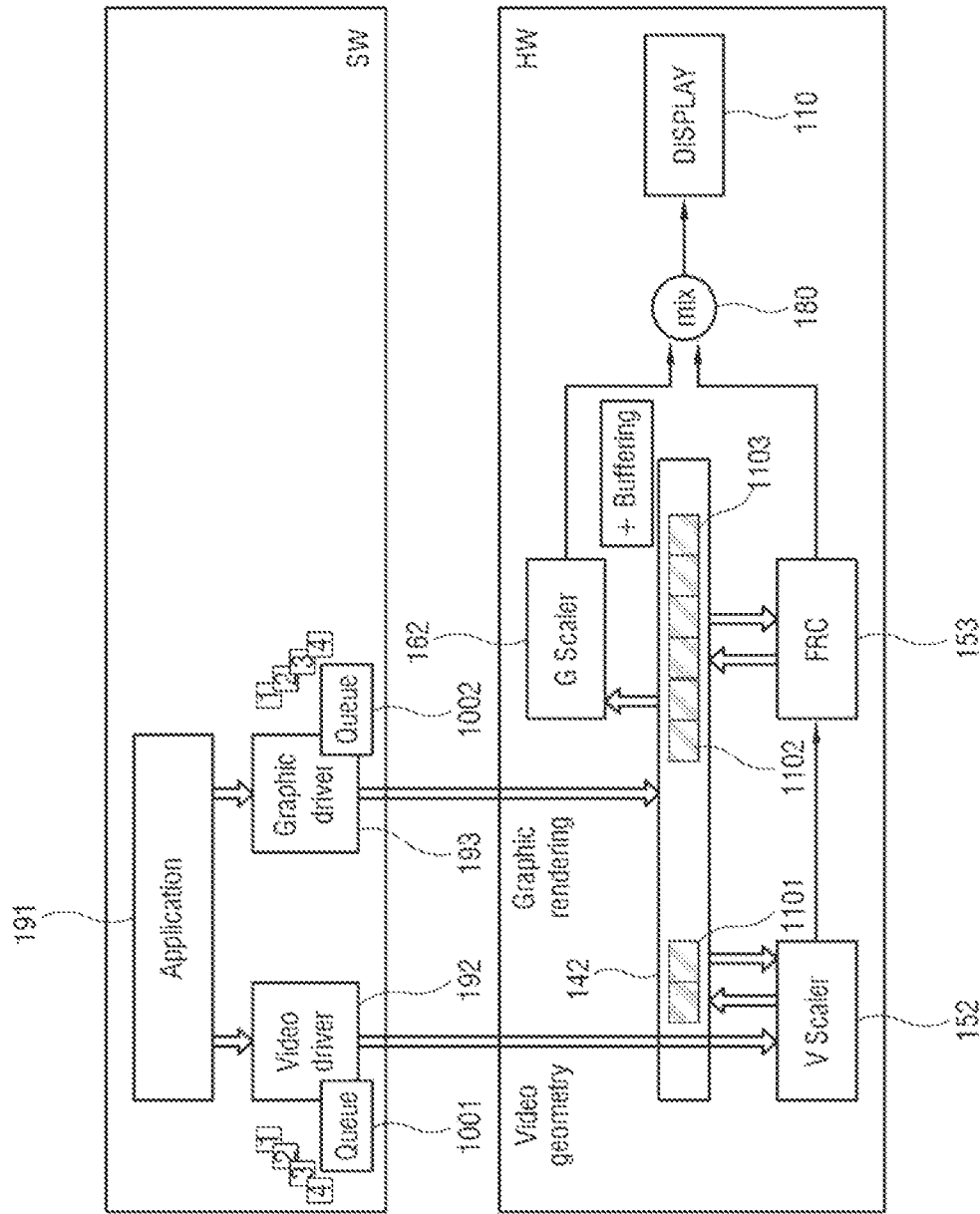

FIG. 20 illustrates operations of elements for synchronizing and displaying an image, for which frame rate conversion is performed, according to the embodiment of FIG. 18.

The electronic apparatus 10 according to the embodiment shown in FIG. 20 may be implemented to further include a graphic buffer 1102 for additional buffering corresponding to a delay time of the video frame, which occurs in the FRC of the video signal (i.e., an FRC delay).

In the electronic apparatus 10 according to an embodiment of the disclosure, a memory 142 may include a video buffer 1101 in which the video frames output from the video scaler 152 are stored in sequence, and a graphic buffer 1102 in which the graphic frames output from the graphic scaler 162 are stored in sequence.

Further, the memory 142 may, as shown in FIG. 20, further include an FRC buffer 1103 as the graphic buffer 1102 to store the graphic frame corresponding to the FRC delay of the video frame.

For example, when a delay of three frames occurs while the FRC 153 performs the FRC for the video signal, the FRC buffer 1103 may be configured to have a size corresponding to the three frames.

Therefore, although the video frames output from the video scaler 152 are delayed due to the FRC process of the FRC 153 and then transmitted to the mixer 180, the graphic frames are delayed as much as an FRC delay offset by the FRC buffer 1103 and then provided to the mixer 180, thereby controlling the matching video and graphic frames to be synchronized and output.

Figure 21:
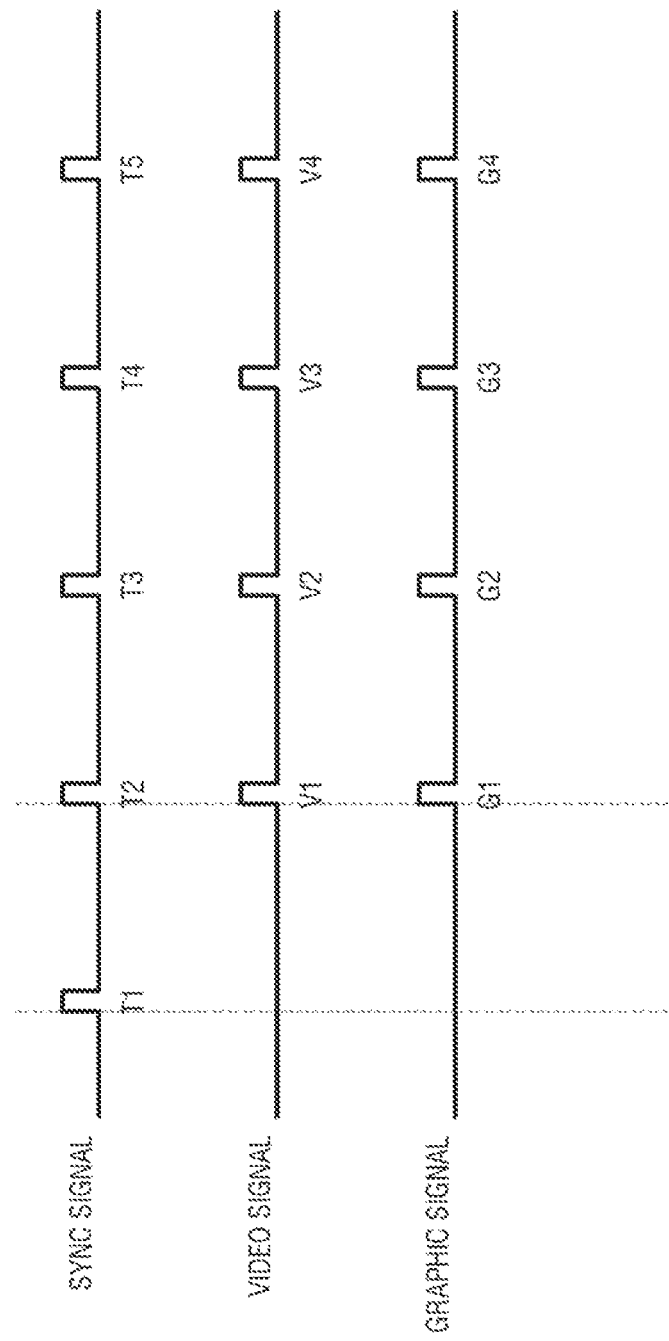
FIG. 21 illustrates an example where a video and a graphic are synchronized and output according to the embodiment of FIG. 18.

FIG. 21 illustrates an example where a video and a graphic are synchronized and output according to the embodiment of FIG. 18.

In the embodiment shown in FIG. 21, the video signal and the graphic signal may be processed, synchronized and output for each frame in response to a predetermined sync signal. Here, the sync signal may use the vertical sync signal ("Vsync") for the display 110 where an image is displayed.

As shown in FIG. 21, in the electronic apparatus 10 according to an embodiment of the disclosure, the data or information about the video frame V1 and the graphic frame G1 respectively stored in the first queue 1001 and the second queue 1002 is popped from each of the queues (the first queue 1001 and the second queue 1002) corresponding to the pair of frames at the timing T1 of the sync signal, and then, the video frame and the graphic frame G1 are controlled to be synchronized by the video scaler 152 and the graphic scaler 162 and output to the mixer 180 at the timing T2 of the sync signal.

In the same manner, the data or information about the video frame V1 and the graphic frame G1 is popped from each of the queues (the first queue 1001 and the second queue 1002) corresponding to the pair of frames at the timing T2, and then the video frame V2 and the graphic frame G2 are controlled to be synchronized by the video scaler 152 and the graphic scaler 162 and output to the mixer 180 at the timing T3 of the sync signal.

Thus, in the electronic apparatus 10 according to the embodiment of FIG. 18, the data of the video frame and the data of the graphic frame, of which the pieces of identification information (i.e., the numbers (or the sequence numbers)) necessarily correspond to each other, are simultaneously popped as a pair from the queues (the first queue 1001 and the second queue 1002), thereby preventing a problem that the matching video and graphic frames are output at different points in time even though any one of the video signal and the graphic signal is delayed due to the different processing paths as described in the related art of FIG. 17. Accordingly, it may be possible to prevent a mismatch or distortion of an image due to a synchronization failure of FIG. 6 between the video and the graphic.

Figure 22:
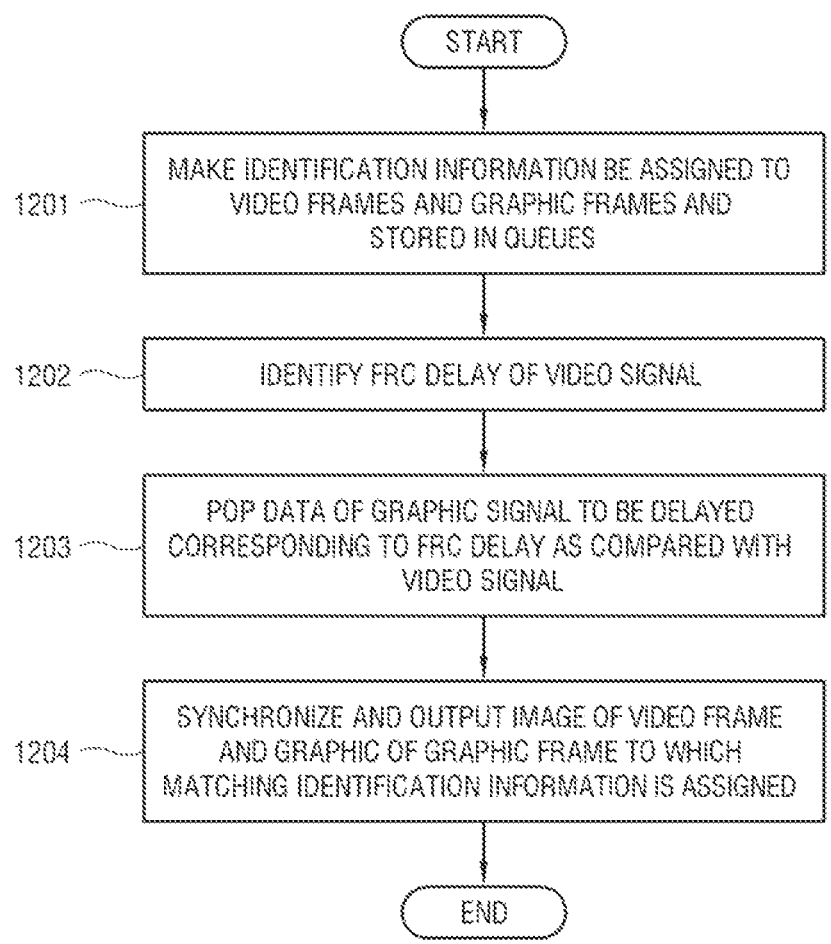
FIG. 22 illustrates control operations for synchronizing and displaying an image in an electronic apparatus according to another embodiment of the disclosure.
Figure 23:
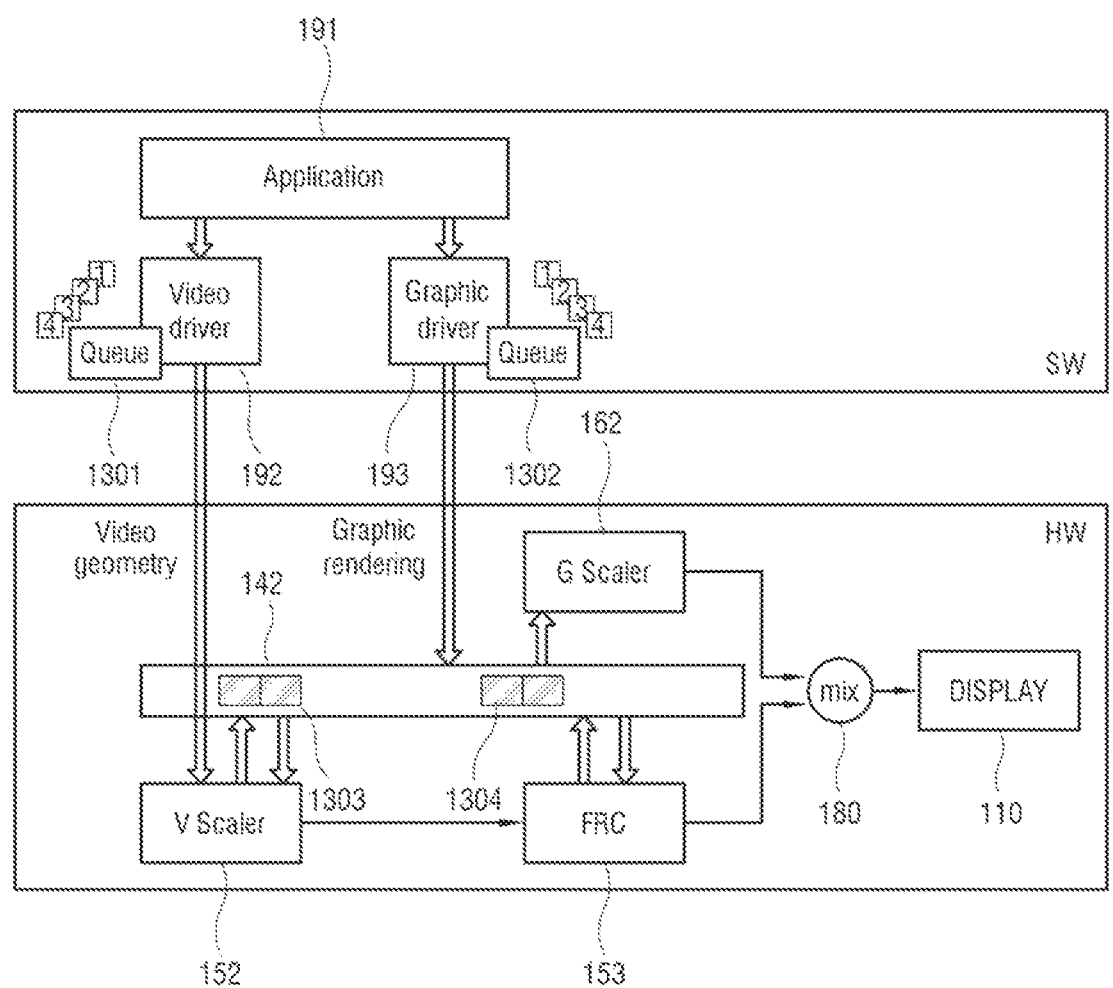
FIG. 23 illustrates operations of elements for synchronizing and displaying an image according to the embodiment of FIG. 22.
Figure 24:
FIG. 24 illustrates an example of delaying and outputting a graphic signal according to the embodiment of FIG. 22.

FIG. 22 illustrates control operations for synchronizing and displaying an image in an electronic apparatus according to another embodiment of the disclosure, FIG. 23 illustrates operations of elements for synchronizing and displaying an image according to the embodiment of FIG. 22, and FIG. 24 illustrates an example of delaying and outputting a graphic signal according to the embodiment of FIG. 22.

In the electronic apparatus according to the embodiment shown in FIG. 22, a delay time that occurs in the FRC of the first signal (i.e., the video signal), in other words, an FRC delay is identified, and the second signal (i.e., the graphic signal) is delayed in advance as much as the FRC delay, thereby controlling the first signal and the second signal to be synchronized and output.

Like the embodiments of FIGS. 15 and 18, the embodiment of FIG. 22 is characterized in that a pair of frames to be displayed together is identified based on the identification information, e.g., the sequence numbers assigned in order of frames, and the data of the graphic frame assigned with the identification number is delayed and popped as compared with the data of the video frame in which the FRC delay occurs.

Specifically, the main processor 190 of the electronic apparatus 10 may, as shown in FIG. 22, assign the numbers (i.e., the sequence numbers) as the identification numbers to the plurality of video frames of the video signal and the plurality of graphic frames of the graphic signal, and store the data of the video signal and the data of the graphic signal, which are assigned with the numbers for each frame, in the queues, respectively (in operation 1201). Here, the queue is configured to store data by the FIFO structure, and therefore each data of the video frame and the graphic frame may be sequentially stored in each queue and then output.

In operation 1201, the main processor 190 may assign the video signal and the graphic signal with identification information for each frame based on the execution (i.e., start) of the synchronization mode, and control the data of the video frame and the graphic frame, for example, the geometry information to be sequentially stored (i.e., enqueued) along with the numbers assigned thereto.

Referring to FIG. 23, the video driver 192 executed by the main processor 190 may assign sequence numbers such as 1, 2, 3, 4, . . . as the identification information to the frames (i.e., the video frames) of the video signal and store the assignment information in a first queue 1301. Likewise, the graphic driver 193 executed by the main processor 190 may match sequence numbers such as 1, 2, 3, 4, . . . as the identification number with the frames (i.e., the graphic frames) of the graphic signal and store the assignment information in a second queue 1302. Therefore, the video frame and the graphic frame, to which the same identification information (i.e., the sequence number) is assigned, may be displayed on the display 110 together as a pair of matching frames.

In operation 1202, the graphic driver 193 executed by the main processor 190 may identify the FRC delay that occurs in the FRC process of the first signal (i.e., the video signal). Here, the main processor 190 may acquire information about the FRC delay that occurs due to the FRC of the FRC 153.

The graphic driver 193 may control the data of the second signal (i.e., the graphic frame), which is assigned with the sequence number in the operation 1201 and stored in the second queue 1302, to be delayed corresponding to the FRC delay identified in the operation 1202 as compared with the first signal (i.e., the video frame) which is assigned with the same sequence number in the operation 1201 and stored in the first queue 1301, thereby popping (i.e., dequeuing or outputting) the data of the second signal from the second queue 1302 (operation 1203). In this process, a graphic rendering point in time of the graphic driver 193 may be artificially delayed corresponding to the FRC delay.

For example, when the FRC delay is identified as two frames in the operation 1202, as shown in FIG. 24 the data of the video frame V1 stored in the first queue 1301 controlled to be popped from the first queue 1301 at the timing T1 of the sync signal (dashed line 1401), but the data of the graphic frame G1 stored in the second queue 1302 and corresponding to the video frame V1 is controlled to be popped from the second queue 1302 at the timing T3 delayed by the two frames (dashed line 1402).

In the same manner, the data of the video frame V2 is controlled to be popped at the timing T2, but the data of the graphic frame G2 corresponding to the video frame V2 is controlled to be popped at the timing T4 delayed by the two frames.

In other words, in the embodiment shown in FIG. 22, the data of one of the pair of frames, to which the matching identification information is assigned, may be controlled to be popped (i.e., dequeued or outputted) as delayed as much as the FRC delay as compared with the data of the other frame in which the FRC delay occurs.

Therefore, the data of the graphic frame G1 is transmitted to the graphic scaler 162 later by the FRC delay than a point in time when the data of the corresponding video frame V1 is transmitted to the video scaler 152.

In addition, the main processor 190 may control the video processor 150 and the graphic processor 160 to synchronize and output the images of a pair of frames, e.g., the video frame V1 and the graphic frame G1, which are passed from the operation 1203 and assigned with the matching identification information (i.e., sequence number) (operation 1204).

Specifically, in operation 1203, the video frame V1 scaled by the video scaler 152 based on the data (i.e., the video geometry information) output at the timing T1 is transmitted to the FRC 153, delayed by two frames during the FRC, and synchronized with the graphic frame G1 output from the graphic scaler 162 based on the data (i.e., the pointer information) output at the timing T3 so that the video frame V1 and the graphic frame G1 can be output to the mixer 180 together.

In the foregoing embodiment, any one of the video frame and the graphic frame to be displayed together (i.e., the graphic frame) is delayed in advance corresponding to the FRC delay of the video and then output, and therefore the video and the graphic corresponding to each other are synchronized, output and overlapped to be displayed on the display 110 together without additionally providing the FRC buffer 1103 for the graphic frame in the memory 142 as shown in FIG. 20.

According to an embodiment, methods according to one or more embodiments of the disclosure may be provided as involved in a computer program product. The computer program product may be traded as a product between a seller and a buyer. The computer program product may be distributed in the form of a machine-readable storage medium (for example, a compact disc read only memory (CD-ROM)) or may be directly or online distributed (for example, downloaded or uploaded) between two user apparatuses example, (for smartphones) through an application store (for example, Play Store™). In the case of the online distribution, at least part of the computer program product (e.g., a downloadable app) may be transitorily stored or temporarily produced in a machine-readable storage medium such as a memory of a manufacturer server, an application-store server, or a relay server.

Although a few exemplary embodiments of the disclosure have been described in detail, various changes may be made in these exemplary embodiments without departing from the scope defined in the appended claims.

What is claimed is:

1. A display apparatus comprising:
   a display;
   a mixer;
   an information processor that is separate from the mixer;
   a main processor configured to provide, to the information processor, area information for a video frame;
   a video processor configured to output the video frame comprising a first area corresponding to the area information for the video frame; and
   a graphic processor configured to output a graphic frame,
   wherein the information processor is configured to:
      generate first transparency information corresponding to first area information for a currently output video frame among a plurality of video frames output in sequence from the video processor, and
      provide the first area information for the currently output video frame and the first transparency information to the mixer,
   wherein the mixer is configured to:
      adjust a transparency of a second area of a currently output graphic frame received from the graphic processor based on the first area information and the first transparency information provided by the information processor, and output, on the display, an image overlapping the currently output video frame received from the video processor and the currently output graphic frame comprising the second area having the adjusted transparency based on the first transparency information corresponding to the first area information of the currently output video frame.

2. The display apparatus of claim 1, wherein the first area of the currently output video frame corresponds to the second area of the currently output graphic frame.

3. The display apparatus of claim 1, wherein the currently output video frame is one frame among the plurality of video frames that are sequentially outputted from the video processor.

4. The display apparatus of claim 1, wherein the information processor comprises a data generator configured to generate the first transparency information-.

5. The display apparatus of claim 4, wherein the data generator is further configured to:
identify the currently output video frame based on data received from the video processor, and
generate the first transparency information corresponding to the first area information for the identified currently output video frame.

6. The display apparatus of claim 5, wherein the first transparency information generated by the data generator is one (1) bit data, and
wherein the information processor further comprises a data converter configured to convert the one (1) bit data of the first transparency information into eight (8) bit data.

7. The display apparatus of claim 1, wherein the first transparency information comprises an alpha value of one ('1') or zero ('0').

8. The display apparatus of claim 1, wherein the graphic processor is further configured to output second transparency information; and
wherein the mixer is further configured to:
select one of the first transparency information that is output from the information processor and the second transparency information that is output from the graphic processor, and
adjust the transparency of the second area of the currently output graphic frame based on the selected one of the first transparency information and the second transparency information.

9. The display apparatus of claim 8, wherein the mixer is further configured to select the first transparency information that is output from the information processor, based on the currently output graphic frame being identified as corresponding to a motion user experience (UX).

10. The display apparatus of claim 1, wherein the first area information for the currently output video frame output from the main processor is provided to the information processor through the video processor.

11. A method performed by a display apparatus, comprising:
outputting, by a video processor of the display apparatus, a video frame comprising a first area corresponding to area information for the video frame;
outputting, by a graphic processor of the display apparatus, a graphic frame;
generating, by an information processor, first transparency information corresponding to first area information for a currently output video frame;
providing, by the information processor, the first area information for the currently output video frame and the first transparency information to a mixer that is different from the information processor;
adjusting a transparency of a second area of a currently output graphic frame received from the graphic processor, based on the first area information and the first transparency information provided by the information processor; and
outputting, by the information processor, an image overlapping the currently output video frame received from the video processor and the currently output graphic frame comprising the second area having the adjusted transparency based on the first transparency information corresponding to the first area information of the currently output video frame.

12. The method of claim 11, wherein the first area of the currently output video frame corresponds to the second area of the currently output graphic frame.

13. The method of claim 11, wherein the currently output video frame is a frame among a plurality of video frames that are sequentially outputted from the video processor.

14. The method of claim 13, further comprising:
identifying the currently output video frame based on data received from the video processor; and
generating the first transparency information corresponding to the first area information for the identified currently output video frame.

15. The method of claim 11, further comprising generating the first transparency information based on the first area information for the currently output video frame.

16. The method of claim 15, further comprising:
generating the first transparency information that is one (1) bit data; and
converting the one (1) bit data of the first transparency information into eight (8) bit data.

17. An electronic device comprising:
a display;
a mixer;
an information processor that is separate from the mixer;
a first processor configured to generate area information for a currently output video frame and to output a currently output graphic frame;
wherein the information processor is configured to:
receive the area information for the currently output video frame,
output the currently output video frame comprising a first area corresponding to the area information for the currently output video frame,
generate transparency information corresponding to the area information for the currently output video frame,
wherein the mixer is configured to:
adjust a transparency of a second area of the currently output graphic frame based on the area information for the currently output video frame and the transparency information, and
output, on the display, an image overlapping the currently output video frame and the currently output graphic frame comprising the second area having the adjusted transparency.

18. The electronic device of claim 17, wherein the first area of the currently output video frame corresponds to the second area of the currently output graphic frame.

\* \* \* \* \*